US010941948B2

(12) United States Patent
Vandermeulen et al.

(10) Patent No.: US 10,941,948 B2
(45) Date of Patent: Mar. 9, 2021

(54) TANK SYSTEM FOR LIQUID DESICCANT AIR CONDITIONING SYSTEM

(71) Applicants: 7AC Technologies, Inc., Beverly, MA (US); Alliance for Sustainable Energy, LLC, Golden, CO (US)

(72) Inventors: Peter F. Vandermeulen, Newburyport, MA (US); Eric Kozubal, Superior, CO (US); Mark A. Allen, Essex, MA (US); Scott N. Rowe, Dover, NH (US)

(73) Assignees: 7AC Technologies, Inc., Beverly, MA (US); Alliance For Sustainable Energy, LLC, Golden, CO (US)

( * ) Notice: Subject to any disclaimer, the term of this patent is extended or adjusted under 35 U.S.C. 154(b) by 0 days.

(21) Appl. No.: 16/178,270

(22) Filed: Nov. 1, 2018

(65) Prior Publication Data
US 2019/0154280 A1 May 23, 2019

Related U.S. Application Data

(60) Provisional application No. 62/580,237, filed on Nov. 1, 2017.

(51) Int. Cl.
*F24F 3/14* (2006.01)
(52) U.S. Cl.
CPC .... *F24F 3/1417* (2013.01); *F24F 2003/1435* (2013.01); *F24F 2003/1458* (2013.01)
(58) Field of Classification Search
CPC ............ F24F 3/1417; F24F 2003/1458; B01D 53/18; B01D 53/263
See application file for complete search history.

(56) References Cited

U.S. PATENT DOCUMENTS

| 1,791,086 | A | | 2/1931 | Sperr |
| 2,221,787 | A | | 11/1940 | Downs et al. |
| 2,235,322 | A | | 3/1941 | Martin |
| 2,290,465 | A | * | 7/1942 | Crawford ............. F24F 3/1417 165/224 |
| 2,433,741 | A | | 12/1947 | Crawford |
| 2,634,958 | A | | 4/1953 | Simpelaar |
| 2,660,159 | A | | 11/1953 | Hughes |
| 2,708,915 | A | | 5/1955 | Mandelburg |
| 2,939,686 | A | | 6/1960 | Wildermuth |
| 2,988,171 | A | | 6/1961 | Arnold et al. |
| 3,119,446 | A | | 1/1964 | Weiss |
| 3,193,001 | A | | 7/1965 | Meckler |

(Continued)

FOREIGN PATENT DOCUMENTS

| CN | 100366981 C | 2/2008 |
| CN | 101336358 A | 12/2008 |

(Continued)

OTHER PUBLICATIONS

1—Open Absorption System for Cooling and Air Conditioning using Membrane Contactors—Annual Report 2005, Publication No. Publication 260097, Project: 101310—Open Absorption System for Cooling and Air Conditioning using Membrane Contactors, Date of publication: Jan. 31, 2006, Author: Manuel Conde-Petit, Robert Weber, Contractor: M. Conde Engineering.

(Continued)

*Primary Examiner* — Christopher R Zerphey

(57) ABSTRACT

A liquid desiccant air conditioning system includes one or more liquid desiccant tanks.

11 Claims, 30 Drawing Sheets

(56) References Cited

U.S. PATENT DOCUMENTS

| | | | |
|---|---|---|---|
| 3,276,634 A | 10/1966 | Arnot | |
| 3,409,969 A | 11/1968 | Simons | |
| 3,410,581 A | 11/1968 | Christensen | |
| 3,455,338 A | 7/1969 | Pollit | |
| 3,718,181 A | 2/1973 | Reilly et al. | |
| 4,100,331 A | 7/1978 | Fletcher et al. | |
| 4,164,125 A * | 8/1979 | Griffiths | F24F 5/0046 62/79 |
| 4,176,523 A | 12/1979 | Rousseau | |
| 4,205,529 A | 6/1980 | Ko | |
| 4,209,368 A | 6/1980 | Coker et al. | |
| 4,222,244 A | 9/1980 | Meckler | |
| 4,235,221 A | 11/1980 | Murphy | |
| 4,239,507 A | 12/1980 | Benoit et al. | |
| 4,259,849 A | 4/1981 | Griffiths | |
| 4,305,456 A | 12/1981 | Mueller et al. | |
| 4,324,947 A | 4/1982 | Dumbeck | |
| 4,341,263 A | 7/1982 | Arbabian | |
| 4,399,862 A | 8/1983 | Hile | |
| 4,429,545 A | 2/1984 | Steinberg | |
| 4,435,339 A | 3/1984 | Kragh | |
| 4,444,992 A | 4/1984 | Cox, III | |
| 4,583,996 A | 4/1986 | Sakata et al. | |
| 4,607,132 A | 8/1986 | Jarnagin | |
| 4,612,019 A | 9/1986 | Langhorst | |
| 4,649,899 A | 3/1987 | Moore | |
| 4,660,390 A | 4/1987 | Worthington | |
| 4,686,938 A | 8/1987 | Rhodes | |
| 4,691,530 A | 9/1987 | Meckler | |
| 4,703,629 A | 11/1987 | Moore | |
| 4,730,600 A | 3/1988 | Harrigill | |
| 4,744,414 A | 5/1988 | Schon | |
| 4,766,952 A | 8/1988 | Onodera | |
| 4,786,301 A | 11/1988 | Rhodes | |
| 4,832,115 A | 5/1989 | Albers et al. | |
| 4,872,578 A | 10/1989 | Fuerschbach et al. | |
| 4,882,907 A | 11/1989 | Brown, II | |
| 4,887,438 A | 12/1989 | Meckler | |
| 4,900,448 A | 2/1990 | Bonne et al. | |
| 4,910,971 A | 3/1990 | McNab | |
| 4,939,906 A | 7/1990 | Spatz et al. | |
| 4,941,324 A | 7/1990 | Peterson et al. | |
| 4,955,205 A | 9/1990 | Wilkinson | |
| 4,971,142 A | 11/1990 | Mergler | |
| 4,976,313 A | 12/1990 | Dahlgren et al. | |
| 4,979,965 A | 12/1990 | Sannholm | |
| 4,984,434 A | 1/1991 | Peterson et al. | |
| 4,987,750 A | 1/1991 | Meckler | |
| 5,005,371 A | 4/1991 | Yonezawa et al. | |
| 5,181,387 A | 1/1993 | Meckler | |
| 5,182,921 A | 2/1993 | Yan | |
| 5,186,903 A | 2/1993 | Cornwell | |
| 5,191,771 A | 3/1993 | Meckler | |
| 5,221,520 A | 6/1993 | Cornwell | |
| 5,351,497 A | 10/1994 | Lowenstein | |
| 5,361,828 A | 11/1994 | Lee et al. | |
| 5,375,429 A | 12/1994 | Tokizaki et al. | |
| 5,448,895 A | 9/1995 | Coellner et al. | |
| 5,462,113 A | 10/1995 | Wand | |
| 5,471,852 A | 12/1995 | Meckler | |
| 5,528,905 A | 6/1996 | Scarlatti | |
| 5,534,186 A | 7/1996 | Walker et al. | |
| 5,582,026 A | 12/1996 | Barto, Sr. | |
| 5,595,690 A | 1/1997 | Filburn et al. | |
| 5,605,628 A | 2/1997 | Davidson et al. | |
| 5,606,865 A | 3/1997 | Caron | |
| 5,638,900 A | 6/1997 | Lowenstein et al. | |
| 5,641,337 A | 6/1997 | Arrowsmith et al. | |
| 5,661,983 A | 9/1997 | Groten et al. | |
| 5,685,152 A | 11/1997 | Sterling | |
| 5,685,485 A | 11/1997 | Mock et al. | |
| 5,797,272 A | 8/1998 | James | |
| 5,816,065 A | 10/1998 | Maeda | |
| 5,832,993 A | 11/1998 | Ohata et al. | |
| 5,860,284 A | 1/1999 | Goland et al. | |
| 5,860,285 A | 1/1999 | Tulpule | |
| 5,928,808 A | 7/1999 | Eshraghi | |
| 5,933,702 A | 8/1999 | Goswami | |
| 5,950,442 A | 9/1999 | Maeda et al. | |
| 6,012,296 A | 1/2000 | Shah | |
| 6,018,954 A | 2/2000 | Assaf | |
| 6,035,657 A | 3/2000 | Dobak, III et al. | |
| 6,083,387 A | 7/2000 | LeBlanc et al. | |
| 6,103,969 A | 8/2000 | Bussey | |
| 6,131,649 A | 10/2000 | Pearl et al. | |
| 6,134,903 A | 10/2000 | Potnis et al. | |
| 6,138,470 A | 10/2000 | Potnis et al. | |
| 6,156,102 A | 12/2000 | Conrad et al. | |
| 6,171,374 B1 | 1/2001 | Barton et al. | |
| 6,216,483 B1 | 4/2001 | Potnis et al. | |
| 6,216,489 B1 | 4/2001 | Potnis et al. | |
| 6,244,062 B1 | 6/2001 | Prado | |
| 6,247,604 B1 | 6/2001 | Taskis et al. | |
| 6,266,975 B1 | 7/2001 | Assaf | |
| 6,417,423 B1 | 7/2002 | Koper et al. | |
| 6,442,951 B1 | 9/2002 | Maeda et al. | |
| 6,463,750 B2 * | 10/2002 | Assaf | F24F 3/1417 62/271 |
| 6,487,872 B1 | 12/2002 | Forkosh et al. | |
| 6,488,900 B1 | 12/2002 | Call et al. | |
| 6,497,107 B2 | 12/2002 | Maisotsenko et al. | |
| 6,497,749 B2 | 12/2002 | Kesten et al. | |
| 6,502,807 B1 | 1/2003 | Assaf et al. | |
| 6,514,321 B1 | 2/2003 | Lehto et al. | |
| 6,539,731 B2 | 4/2003 | Kesten et al. | |
| 6,546,746 B2 | 4/2003 | Forkosh et al. | |
| 6,557,365 B2 | 5/2003 | Dinnage et al. | |
| 6,660,069 B2 | 12/2003 | Sato et al. | |
| 6,684,649 B1 | 2/2004 | Thompson | |
| 6,739,142 B2 | 5/2004 | Korin | |
| 6,745,826 B2 | 6/2004 | Lowenstein et al. | |
| 6,766,817 B2 | 7/2004 | da Silva et al. | |
| 6,848,265 B2 | 2/2005 | Lowenstein et al. | |
| 6,854,278 B2 | 2/2005 | Maisotsenko et al. | |
| 6,854,279 B1 | 2/2005 | Digiovanni et al. | |
| 6,887,303 B2 * | 5/2005 | Hesse | B01D 53/268 95/52 |
| 6,918,404 B2 | 7/2005 | Dias da Silva et al. | |
| 6,938,434 B1 | 9/2005 | Fair | |
| 6,945,065 B2 | 9/2005 | Lee et al. | |
| 6,976,365 B2 | 12/2005 | Forkosh et al. | |
| 6,986,428 B2 | 1/2006 | Hester et al. | |
| 7,066,586 B2 | 6/2006 | da Silva et al. | |
| RE39,288 E | 9/2006 | Assaf | |
| 7,143,597 B2 | 12/2006 | Hyland et al. | |
| 7,191,821 B2 | 3/2007 | Gronwall et al. | |
| 7,197,887 B2 | 4/2007 | Maisotsenko et al. | |
| 7,228,891 B2 | 6/2007 | Shin et al. | |
| 7,258,923 B2 | 8/2007 | van den Bogerd et al. | |
| 7,269,966 B2 | 9/2007 | Lowenstein et al. | |
| 7,279,215 B2 | 10/2007 | Hester et al. | |
| 7,306,650 B2 | 12/2007 | Slayzak et al. | |
| 7,337,615 B2 | 3/2008 | Reidy | |
| 7,430,878 B2 | 10/2008 | Assaf | |
| 7,758,671 B2 | 7/2010 | Kesten et al. | |
| 7,841,201 B2 | 11/2010 | Sedlak et al. | |
| 7,930,896 B2 | 4/2011 | Matsui et al. | |
| 7,938,888 B2 | 5/2011 | Assaf | |
| 8,141,379 B2 | 3/2012 | Ai-Hadhrami et al. | |
| 8,337,590 B2 | 12/2012 | Herencia et al. | |
| 8,353,175 B2 | 1/2013 | Wohlert | |
| 8,496,732 B2 | 7/2013 | Culp et al. | |
| 8,499,576 B2 | 8/2013 | Meijer | |
| 8,500,960 B2 | 8/2013 | Ehrenberg et al. | |
| 8,623,210 B2 | 1/2014 | Manabe et al. | |
| 8,641,806 B2 | 2/2014 | Claridge et al. | |
| 8,648,209 B1 | 2/2014 | Lastella | |
| 8,695,363 B2 | 4/2014 | Tang et al. | |
| 8,696,805 B2 | 4/2014 | Chang et al. | |
| 8,769,971 B2 | 7/2014 | Kozubal et al. | |
| 8,790,454 B2 | 7/2014 | Lee et al. | |
| 8,800,308 B2 | 8/2014 | Vandermeulen et al. | |
| 8,876,943 B2 | 11/2014 | Gottlieb et al. | |
| 8,881,806 B2 | 11/2014 | Xie et al. | |

(56) References Cited

U.S. PATENT DOCUMENTS

| | | | |
|---|---|---|---|
| 8,887,523 B2 * | 11/2014 | Gommed | F24F 3/1417 62/477 |
| 8,943,844 B2 | 2/2015 | Forkosh | |
| 8,943,850 B2 | 2/2015 | Vandermeulen et al. | |
| 8,968,945 B2 | 3/2015 | Fasold et al. | |
| 9,000,289 B2 | 4/2015 | Vandermeulen et al. | |
| 9,086,223 B2 * | 7/2015 | Vandermeulen | F28F 3/10 |
| 9,101,874 B2 * | 8/2015 | Vandermeulen | B01D 53/229 |
| 9,101,875 B2 | 8/2015 | Vandermeulen et al. | |
| 9,243,810 B2 | 1/2016 | Vandermeulen et al. | |
| 9,273,877 B2 | 3/2016 | Vandermeulen et al. | |
| 9,308,490 B2 | 4/2016 | Vandermeulen et al. | |
| 9,377,207 B2 | 6/2016 | Vandermeulen et al. | |
| 9,429,332 B2 | 8/2016 | Vandermeulen et al. | |
| 9,470,426 B2 | 10/2016 | Vandermeulen | |
| 9,506,697 B2 | 11/2016 | Vandermeulen | |
| 9,631,823 B2 | 4/2017 | Vandermeulen et al. | |
| 9,631,824 B1 | 4/2017 | Maisey et al. | |
| 9,631,848 B2 * | 4/2017 | Vandermeulen | F24F 3/1417 |
| 9,709,285 B2 | 7/2017 | Vandermeulen | |
| 9,709,286 B2 | 7/2017 | Vandermeulen et al. | |
| 9,835,340 B2 | 12/2017 | Vandermeulen et al. | |
| 10,006,648 B2 | 6/2018 | Vandermeulen et al. | |
| 10,024,558 B2 | 7/2018 | Vandermeulen | |
| 10,024,601 B2 | 7/2018 | Vandermeulen | |
| 10,041,692 B2 * | 8/2018 | Kandil | B01D 53/263 |
| 10,168,056 B2 | 1/2019 | Vandermeulen | |
| 10,323,867 B2 | 6/2019 | Vandermeulen | |
| 10,443,868 B2 | 10/2019 | Vandermeulen et al. | |
| 10,591,191 B2 | 3/2020 | Christians et al. | |
| 10,619,867 B2 | 4/2020 | Vandermeulen | |
| 10,619,868 B2 | 4/2020 | Vandermeulen | |
| 10,619,895 B1 | 4/2020 | Vandermeulen | |
| 10,731,876 B2 | 8/2020 | Vandermeulen | |
| 10,753,624 B2 | 8/2020 | Vandermeulen et al. | |
| 10,760,830 B2 | 9/2020 | Vandermeulen et al. | |
| 2001/0008148 A1 | 7/2001 | Ito et al. | |
| 2001/0013226 A1 | 8/2001 | Potnis et al. | |
| 2001/0015500 A1 | 8/2001 | Shimanuki et al. | |
| 2002/0023740 A1 | 2/2002 | Lowenstein et al. | |
| 2002/0026797 A1 | 3/2002 | Sundhar | |
| 2002/0038552 A1 | 4/2002 | Maisotsenko et al. | |
| 2002/0098395 A1 | 7/2002 | Shimanuki et al. | |
| 2002/0104439 A1 | 8/2002 | Komkova et al. | |
| 2002/0139245 A1 | 10/2002 | Kesten et al. | |
| 2002/0139320 A1 | 10/2002 | Shimanuki et al. | |
| 2002/0148602 A1 | 10/2002 | Nakamura | |
| 2002/0185266 A1 | 12/2002 | Dobbs et al. | |
| 2003/0000230 A1 | 1/2003 | Kopko | |
| 2003/0029185 A1 | 2/2003 | Kopko | |
| 2003/0033821 A1 | 2/2003 | Maisotsenko et al. | |
| 2003/0051367 A1 * | 3/2003 | Griffin | F26B 5/005 34/132 |
| 2003/0051498 A1 | 3/2003 | Sanford | |
| 2003/0106680 A1 | 6/2003 | Serpico et al. | |
| 2003/0121271 A1 | 7/2003 | Dinnage et al. | |
| 2003/0209017 A1 | 11/2003 | Maisotsenko et al. | |
| 2003/0230092 A1 | 12/2003 | Lowenstein et al. | |
| 2004/0040697 A1 | 3/2004 | Pierre et al. | |
| 2004/0061245 A1 | 4/2004 | Maisotsenko et al. | |
| 2004/0101698 A1 | 5/2004 | Yamanaka et al. | |
| 2004/0109798 A1 | 6/2004 | Chopard et al. | |
| 2004/0112077 A1 | 6/2004 | Forkosh et al. | |
| 2004/0118125 A1 | 6/2004 | Potnis et al. | |
| 2004/0134212 A1 | 7/2004 | Lee et al. | |
| 2004/0168462 A1 | 9/2004 | Assaf | |
| 2004/0194944 A1 | 10/2004 | Hendricks et al. | |
| 2004/0211207 A1 | 10/2004 | Forkosh et al. | |
| 2004/0230092 A1 | 11/2004 | Thierfelder et al. | |
| 2004/0231512 A1 | 11/2004 | Slayzak et al. | |
| 2004/0261440 A1 | 12/2004 | Forkosh et al. | |
| 2005/0095433 A1 | 5/2005 | Bogerd et al. | |
| 2005/0106021 A1 | 5/2005 | Bunker et al. | |
| 2005/0109052 A1 | 5/2005 | Albers et al. | |
| 2005/0133082 A1 | 6/2005 | Konold et al. | |
| 2005/0210907 A1 | 9/2005 | Gillan et al. | |
| 2005/0217485 A1 | 10/2005 | Olapinski et al. | |
| 2005/0218535 A1 | 10/2005 | Maisotsenko et al. | |
| 2005/0257551 A1 | 11/2005 | Landry | |
| 2006/0042295 A1 | 3/2006 | Assaf | |
| 2006/0070728 A1 | 4/2006 | Shin et al. | |
| 2006/0124287 A1 | 6/2006 | Reinders | |
| 2006/0156750 A1 | 7/2006 | Lowenstein et al. | |
| 2006/0156761 A1 | 7/2006 | Mola et al. | |
| 2006/0278089 A1 | 12/2006 | Theilow | |
| 2007/0169916 A1 | 7/2007 | Wand et al. | |
| 2007/0175234 A1 | 8/2007 | Pruitt | |
| 2007/0234743 A1 | 10/2007 | Assaf | |
| 2008/0127965 A1 | 6/2008 | Burton | |
| 2008/0156471 A1 | 7/2008 | Han et al. | |
| 2008/0196758 A1 | 8/2008 | McGuire | |
| 2008/0203866 A1 | 8/2008 | Chamberlain | |
| 2008/0302357 A1 | 12/2008 | DeNault | |
| 2008/0314567 A1 | 12/2008 | Noren | |
| 2009/0000732 A1 | 1/2009 | Jacobine et al. | |
| 2009/0056919 A1 | 3/2009 | Hoffman et al. | |
| 2009/0095162 A1 | 4/2009 | Hargis et al. | |
| 2009/0126913 A1 | 5/2009 | Lee et al. | |
| 2009/0173096 A1 | 7/2009 | Wohlert | |
| 2009/0183857 A1 | 7/2009 | Pierce et al. | |
| 2009/0200022 A1 | 8/2009 | Bravo et al. | |
| 2009/0238685 A1 | 9/2009 | Santa Ana | |
| 2010/0000247 A1 | 1/2010 | Bhatti et al. | |
| 2010/0012309 A1 | 1/2010 | Uges | |
| 2010/0018322 A1 | 1/2010 | Neitzke et al. | |
| 2010/0051083 A1 | 3/2010 | Boyk | |
| 2010/0077783 A1 | 4/2010 | Bhatti et al. | |
| 2010/0084120 A1 | 4/2010 | Yin et al. | |
| 2010/0090356 A1 * | 4/2010 | Sines | B01D 53/263 261/29 |
| 2010/0170776 A1 | 7/2010 | Ehrenberg et al. | |
| 2010/0319370 A1 | 12/2010 | Kozubal et al. | |
| 2011/0073290 A1 | 3/2011 | Chang et al. | |
| 2011/0100618 A1 | 5/2011 | Carlson | |
| 2011/0101117 A1 | 5/2011 | Miyauchi et al. | |
| 2011/0126885 A1 | 6/2011 | Kokotov et al. | |
| 2011/0132027 A1 | 6/2011 | Gommed et al. | |
| 2011/0209858 A1 | 9/2011 | Konno | |
| 2012/0052785 A1 | 3/2012 | Nagamatsu et al. | |
| 2012/0114527 A1 | 5/2012 | Hoglund et al. | |
| 2012/0118148 A1 | 5/2012 | Culp et al. | |
| 2012/0118155 A1 | 5/2012 | Claridge et al. | |
| 2012/0125020 A1 | 5/2012 | Vandermeulen et al. | |
| 2012/0125021 A1 | 5/2012 | Vandermeulen et al. | |
| 2012/0125031 A1 | 5/2012 | Vandermeulen et al. | |
| 2012/0125581 A1 | 5/2012 | Allen et al. | |
| 2012/0131937 A1 | 5/2012 | Vandermeulen et al. | |
| 2012/0131938 A1 | 5/2012 | Vandermeulen et al. | |
| 2012/0131939 A1 | 5/2012 | Vandermeulen et al. | |
| 2012/0132513 A1 | 5/2012 | Vandermeulen et al. | |
| 2012/0152318 A1 | 6/2012 | Kee | |
| 2012/0186281 A1 | 7/2012 | Vandermeulen et al. | |
| 2013/0056177 A1 | 3/2013 | Coutu et al. | |
| 2013/0101909 A1 | 4/2013 | Fasold et al. | |
| 2013/0186121 A1 | 7/2013 | Erb et al. | |
| 2013/0199220 A1 | 8/2013 | Ma et al. | |
| 2013/0227982 A1 | 9/2013 | Forkosh | |
| 2013/0255287 A1 | 10/2013 | Forkosh | |
| 2013/0340449 A1 | 12/2013 | Kozubal et al. | |
| 2014/0054004 A1 | 2/2014 | LePoudre et al. | |
| 2014/0054013 A1 | 2/2014 | LePoudre et al. | |
| 2014/0150481 A1 | 6/2014 | Vandermeulen | |
| 2014/0150656 A1 | 6/2014 | Vandermeulen | |
| 2014/0150657 A1 | 6/2014 | Vandermeulen et al. | |
| 2014/0150662 A1 | 6/2014 | Vandermeulen et al. | |
| 2014/0223947 A1 | 8/2014 | Ranjan et al. | |
| 2014/0245769 A1 | 9/2014 | Vandermeulen et al. | |
| 2014/0250935 A1 | 9/2014 | Prochaska et al. | |
| 2014/0260367 A1 | 9/2014 | Coutu et al. | |
| 2014/0260369 A1 | 9/2014 | LePoudre | |
| 2014/0260371 A1 | 9/2014 | Vandermeulen | |
| 2014/0260398 A1 | 9/2014 | Kozubal et al. | |
| 2014/0260399 A1 * | 9/2014 | Vandermeulen | F24F 3/1411 62/271 |

(56) References Cited

U.S. PATENT DOCUMENTS

| | | |
|---|---|---|
| 2014/0262125 A1 | 9/2014 | Erb et al. |
| 2014/0262144 A1 | 9/2014 | Erb et al. |
| 2014/0264968 A1 | 9/2014 | Erb et al. |
| 2014/0360373 A1 | 12/2014 | Peacos et al. |
| 2014/0366567 A1 | 12/2014 | Vandermeulen |
| 2015/0107287 A1 | 4/2015 | Forkosh |
| 2015/0153210 A1 | 6/2015 | Bartlett et al. |
| 2015/0184876 A1 | 7/2015 | Vandermeulen et al. |
| 2015/0228993 A1 | 8/2015 | Mori et al. |
| 2015/0300754 A1 | 10/2015 | Vandermeulen et al. |
| 2015/0308711 A1 | 10/2015 | Gillan et al. |
| 2015/0316288 A1 | 11/2015 | Erickson et al. |
| 2015/0323216 A1 | 11/2015 | Wallin |
| 2015/0338140 A1 | 11/2015 | Vandermeulen |
| 2016/0187011 A1 | 6/2016 | Vandermeulen |
| 2016/0290665 A1 | 10/2016 | Vandermeulen et al. |
| 2016/0290666 A1 | 10/2016 | Coutu et al. |
| 2017/0045257 A1 | 2/2017 | Moffitt |
| 2017/0074530 A1 | 3/2017 | Kozubal |
| 2017/0102155 A1 | 4/2017 | Vandermeulen |
| 2017/0106639 A1 | 4/2017 | Vandermeulen et al. |
| 2017/0167794 A1 | 6/2017 | Vandermeulen |
| 2017/0184319 A1 | 6/2017 | Vandermeulen et al. |
| 2017/0241655 A1 | 8/2017 | LePoudre et al. |
| 2017/0292722 A1 | 10/2017 | Vandermeulen |
| 2018/0051897 A1 | 2/2018 | Vandermeulen et al. |
| 2018/0163977 A1 | 6/2018 | Vandermeulen |
| 2020/0096241 A1 | 3/2020 | Vandermeulen |
| 2020/0141593 A1 | 5/2020 | Vandermeulen et al. |
| 2020/0173671 A1 | 6/2020 | Rowe et al. |
| 2020/0182493 A1 | 6/2020 | Luttik |

FOREIGN PATENT DOCUMENTS

| | | |
|---|---|---|
| CN | 100476308 C | 4/2009 |
| CN | 101636630 A | 1/2010 |
| CN | 102282426 A | 12/2011 |
| CN | 202229469 U | 5/2012 |
| CN | 202734094 U | 2/2013 |
| EP | 0781972 A2 | 7/1997 |
| EP | 1120609 A1 | 8/2001 |
| EP | 1563229 A1 | 8/2005 |
| EP | 1781995 A1 | 5/2007 |
| EP | 2256434 A2 | 12/2010 |
| EP | 2306100 A1 | 4/2011 |
| EP | 2787293 A1 | 10/2014 |
| GB | 1172247 A | 11/1969 |
| JP | S54-77443 A | 6/1979 |
| JP | S62-297647 A | 12/1987 |
| JP | 02306067 A | 12/1990 |
| JP | H03-125830 A | 5/1991 |
| JP | H03-213921 A | 9/1991 |
| JP | H08-105669 A | 4/1996 |
| JP | H09-184692 A | 7/1997 |
| JP | H10-220914 A | 8/1998 |
| JP | H11-137948 A | 5/1999 |
| JP | H11-197439 A | 7/1999 |
| JP | H11-351700 A | 12/1999 |
| JP | 2000-230730 A | 8/2000 |
| JP | 2001-517773 A | 10/2001 |
| JP | 2002-206834 A | 7/2002 |
| JP | 2004-524504 A | 8/2004 |
| JP | 2005-134060 A | 5/2005 |
| JP | 2006-263508 A | 10/2006 |
| JP | 2006-529022 A | 12/2006 |
| JP | 2008-020138 A | 1/2008 |
| JP | 2009-517622 A | 4/2009 |
| JP | 2009-0427355 B2 | 6/2009 |
| JP | 2009-180433 A | 8/2009 |
| JP | 2009-192101 A | 8/2009 |
| JP | 2009-281668 A | 12/2009 |
| JP | 2009-293831 A | 12/2009 |
| JP | 2010002162 A | 1/2010 |
| JP | 201054136 A | 3/2010 |
| JP | 2010-247022 A | 11/2010 |
| JP | 2011-064359 A | 3/2011 |
| JP | 2011-511244 A | 4/2011 |
| JP | 201192815 A | 5/2011 |
| JP | 2011-163682 A | 8/2011 |
| JP | 2012-073013 A | 4/2012 |
| JP | 2013-064549 A | 4/2013 |
| KR | 10-2001-0017939 A | 3/2001 |
| KR | 2004-0026242 A | 3/2004 |
| KR | 10-0510774 B1 | 8/2005 |
| KR | 2014-0022785 A | 2/2014 |
| TW | 201009269 A | 3/2010 |
| WO | WO-1997021061 A1 | 6/1997 |
| WO | WO-1999022180 A1 | 5/1999 |
| WO | WO-2000011426 A1 | 3/2000 |
| WO | WO-2000055546 A1 | 9/2000 |
| WO | WO-2002066901 A1 | 8/2002 |
| WO | WO-2002086391 A1 | 10/2002 |
| WO | WO-2003004937 A1 | 1/2003 |
| WO | WO-2004046618 A1 | 6/2004 |
| WO | WO-2006006177 A1 | 1/2006 |
| WO | WO-2008037079 A1 | 4/2008 |
| WO | WO-2009094032 A1 | 7/2009 |
| WO | WO-2009144880 A1 | 12/2009 |
| WO | WO-2009157277 A1 | 12/2009 |
| WO | WO-2011062808 A1 | 5/2011 |
| WO | WO-2011161547 A2 | 12/2011 |
| WO | WO-2012071036 A1 | 5/2012 |
| WO | WO-2012082093 A1 | 6/2012 |
| WO | WO-2013172789 A1 | 11/2013 |

OTHER PUBLICATIONS

2—Open Absorption System for Cooling and Air Conditioning using Membrane Contactors—Annual, Report 2006, Publication No. Publication 260098, Project: 101310—Open Absorption System for Cooling and Air Conditioning using Membrane Contactors, Date of publication: Nov. 14, 2006, Author: Manuel Conde-Petit, Robert Weber, Contractor: M. Conde Engineering.

3—Open Absorption System for Cooling and Air Conditioning Using Membrane Contactors—Final Report, Publication No. Publication 280139, Project: 101310—Open Absorption System for Cooling and Air Conditioning using Membrane Contactors, Date of publication: Jul. 8, 2008, Author: Viktor Dorer, Manuel Conde-Petit, Robert Weber, Contractor: M. Conde Engineering.

4—Conde-Petit, M. 2007. Liquid Desiccant-Based Air-Conditioning Systems—LDACS, Proc. of the 1st European Conference on Polygeneration—Technologies and Applications, 217-234, A. Coronas, ed., Tarragona—Spain, Oct. 16-17, Published by CREVER—Universitat Rovira I Virgili, Tarragona, Spain.

5—Conde-Petit, M. 2008. Open Absorption Systems for Air-Conditioning using Membrane Contactors,Proceedings '15. Schweizerisches Status-Seminar «Energie-und Umweltforschung im Bauwesen»', Sep. 11-12—ETH Zurich, Switzerland. Published by BRENET—Eggwilstr. 16a, CH-9552 Bronschhofen—Switzerland (brenet@vogel-tech.ch).

6—Third Party Observations for PCT/US2011/037936, dated Sep. 24, 2012.

Ashrae, et al., "Desiccant Dehumidification and Pressue Drying Equipment," 2012 ASHRAE Handbook—HVAC Systems and Equipment, Chapter 24, pp. 24.1-24.12.

Beccali, et al., "Energy and Economic Assessment of Desiccant Cooling," Solar Energy, Issue 83, pp. 1828-1846, Aug. 2009.

Fimbres-Weihs, et al., "Review of 3D CFD modeling of flow and mass transfer in narrow spacer-filled channels in membrane modules," Chemical Engineering and Processing 49 (2010) pp. 759-781.

Lachner, "An Investigation into the Feasibility of the Use of Water as a Refrigerant," International Refrigeration and Air Conditioning Conference, 723:1-9 (2004).

Li, F., et al., "Novel spacers for mass transfer enhancement in membrane separations," Journal of Membrane Science, 253 (2005), pp. 1-12.

Li, Y., et al., "CFD simulation of fluid flow through spacer-filled membrane module: selecting suitable cell types for periodic boundary conditions," Desalination 233 (2008) pp. 351-358.

(56) References Cited

OTHER PUBLICATIONS

Liu, et al., "Research Progress in Liquid Desiccant Air Conditioning Devices and Systems," Frontiers of Energy and Power Engineering in China, vol. 4, Issue 1, pp. 55-65, Feb. 2010.
Lowenstein, "A Solar Liquid-Desiccant Air Conditioner," Solar 2003, Proceedings of the 32nd ASES Annual Conference, Austin, TX, Jul. 2003.
Mathioulakis, "Desalination by Using Alternative Energy," Desalination, Issue 203, pp. 346-365, 2007.
Perry "Perry's Chemical Engineers handbook" 1999 McGraw Hill p. 11-52,11-53.
Refrigerant—Random House Kernerman Webster's College Dictionary, "Refrigerant," Random House, <https://thefreedictionary.com/refrigerant> (2010).
Russell, et al., "Optimization of Photovolatic Thermal Collector Heat Pump Systems," ISES International Solar Energy Conference, Atlanta, GA, vol. 3, pp. 1870-1874, May 1979.
Siphon—Encyclopedia Americana. "Siphon." Grolier Online, 2015. Web. Apr. 3, 2015. 1 page.
Welty, "Liquid Desiccant Dehumidification," Engineered Systems, May 2010, vol. 27 Issue 5, p. 34.
International Search Report for International Application No. PCT/US2018/058765 dated Mar. 11, 2019.

\* cited by examiner

TANK SYSTEM FOR LIQUID DESICCANT AIR CONDITIONING SYSTEM

CROSS REFERENCE TO RELATED APPLICATION

This application claims priority from U.S. Provisional Patent Application No. 62/580,237 filed on Nov. 1, 2017 entitled TANK SYSTEM FOR LIQUID DESICCANT AIR CONDITIONING SYSTEM, which is hereby incorporated by reference.

STATEMENT AS TO FEDERALLY SPONSORED RESEARCH

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

The present application relates generally to the use of liquid desiccants in combination with heat pumps, compressors, and chillers to dehumidify and cool, or heat and humidify an air stream entering a space. One or more embodiments of the application relates to the replacement of conventional air conditioning units with (membrane-based) liquid desiccant air conditioning systems to accomplish substantially the same heating and cooling capabilities and at the same time provide additional functionality. The additional functionality can include, e.g., the ability for the system to heat and simultaneously humidify the space, for the system to heat and simultaneously dehumidify, or to cool with humidification, thereby providing for more comfortable and healthier indoor air conditions than conventional systems will provide.

Desiccant dehumidification systems—both liquid and solid desiccants—have been used in parallel to conventional vapor compression HVAC equipment to help reduce humidity in spaces, particularly in spaces that require large amounts of outdoor air or that have large humidity loads inside the building space itself. (ASHRAE 2012 Handbook of HVAC Systems and Equipment, Chapter 24, p. 24.10). Humid climates, e.g., Miami, Fla., require a lot of energy to properly treat (dehumidify and cool) the fresh air that is required for a space's occupant comfort. Desiccant dehumidification systems—both solid and liquid—have been used for many years and are generally quite efficient at removing moisture from the air stream. However, liquid desiccant systems generally use concentrated salt solutions such as ionic solutions of LiCl, LiBr or $CaCl_2$ and water. Such brines are strongly corrosive to metals, even in small quantities, so numerous attempts have been made over the years to prevent desiccant carry-over to the air stream that is to be treated. In recent years, efforts have begun to eliminate the risk of desiccant carry-over by employing micro-porous membranes to contain the desiccant solution. These membrane-based liquid desiccant systems have been primarily applied to unitary rooftop units for commercial buildings. However, in addition to rooftop units, commercial buildings also use air handlers located inside technical spaces in the building for the cooling and heating of both outside air and recirculated air. There is an additional substantial market for chillers that provide cold water to coils inside the building and use evaporative cooling for high efficiency condensers.

Residential and small commercial buildings often use split air conditioners wherein the condenser (together with the compressor and control system) is located outside and one or more evaporator cooling coils is installed in the space than needs to be cooled. In Asia in particular (which is generally hot and humid) the split air conditioning system is the preferred method of cooling (and sometimes heating) a space. Disclosed herein are solutions that are highly suitable for such a split approach using liquid desiccant heat exchangers.

Liquid desiccant systems generally have two separate functions. The conditioning side of the system provides conditioning of air to the required conditions, which are typically set using thermostats or humidistats. The regeneration side of the system provides a reconditioning function of the liquid desiccant so that it can be re-used on the conditioning side. Liquid desiccant is typically pumped or moved between the two sides, and a control system helps to ensure that the liquid desiccant is properly balanced between the two sides as conditions necessitate and that excess heat and moisture are properly dealt with, without leading to over-concentrating or under-concentrating of the desiccant.

During the cooling cycle, effective dehumidification can be achieved at higher evaporator temperatures, while the regeneration can fully reject the condenser energy at lower temperatures than traditional air-cooled systems. As a result, the compressor can move energy from the conditioned space at a much lower temperature differential than traditional systems. This improves the efficiency of the compressor in proportion to the reduction in the temperature difference. This drives the efficiency of the combination of compressor-based cooling and heating with liquid desiccant heat exchangers.

The benefits of liquid desiccant systems as described in U.S. Pat. No. 9,243,810 and other patents have been clearly demonstrated for hot and humid climates with a large latent load. As buildings get better insulated, these latent loads increase as a percentage of total cooling loads, making effective dehumidification more important. As internal sensible loads are reduced in tighter, better insulated buildings, conditioning ventilation air becomes an even more significant part of total cooling and heating loads.

Extreme design conditions, including very humid and cool, very hot and dry, and very humid and cold require special cooling and heating solutions for which earlier liquid desiccant systems are not optimized.

For example, at very high temperatures (>100F) and very low humidity (<20% RH), existing liquid desiccant systems cannot operate efficiently and need special controls to avoid crystallization of the desiccant. Traditional evaporative cooling systems do well at low humidities and moderate cooling requirements, but are unable to deal with extreme heat or with more humid conditions that tend to occur at least part of the time in most locations. These conditions require compressor-based solutions, which are much less efficient and lose significant capacity at high temperatures and/or very high humidities. As a result, they tend to process a mix of outside and return air.

For ventilation air, the 920 standard C and D conditions require air to be dehumidified and heated to 70F. Existing systems use reheat, hot gas bypass, solid desiccants or other options, which significantly increase system costs and complexity. As disclosed herein, a small coil in the liquid desiccant system can further increase the basic efficiency of liquid desiccant systems, especially for those conditions.

Traditional cooling systems use refrigerant coils that are air cooled and are best suited for sensible cooling. Condense forming on the coil acts as an insulator that reduces its capacity. Thus, multiple coils need to be used in series to fully dehumidify and cool the air. Four and six row coils are not common. Still, traditional systems often cannot handle the full latent load without significantly overcooling the air and then reheating it, or mixing high volumes of return air with small volumes of outside air to minimize the humidity level of the mix. Especially on days where only a small amount of sensible cooling is required, the building can reach unacceptable levels of humidity. On cold and humid days, such as in the rainy season, with relative humidity levels >90% and low temperatures, heating the air would be preferred while also dehumidifying it. Many split systems provide heating by operating as a reversible heat pump system. These tend to be most useful in moderate climates where cooling and heating loads are roughly in balance. Very cold climates, like the Midwest and Northeast of the US, still require additional heating, often from natural gas or oil. In more moderate climates, heat pump effectiveness is limited by humidity, which leads to frost forming and the use of very inefficient can defrost cycles. As disclosed herein, defrost can be avoided by using liquid desiccant systems.

Commercial ventilation standards (AHRI) have been upgraded and now require 20 CFM per person instead of 5 CFM. Controlled outside air is also becoming more important for residential applications as insulation improves and infiltration is reduced. Traditionally, outside air requirements were met by "infiltration"—open doors and windows and leaks. Earlier patents by 7AC Technologies Inc. have already shown how liquid desiccants can significantly improve the efficiency of such systems.

The high humidity levels of outside air are difficult to meet with the thin coils used in many residential systems. Removal of condense is a special problem for split systems. Condense management has a significant impact on installation and maintenance cost. Condense lines can get plugged if not well maintained, which leads to moisture damage if not restored in a timely manner. As disclosed herein, liquid desiccant heat exchanger can solve these problems.

Additional building humidity "guidelines" are being developed to encourage maximum, and sometimes even minimum, humidity levels, mostly driven by health considerations, especially the impact on respiratory disease and allergies.

In dry climates, water cooled chillers and evaporative coolers use the evaporation energy of water to cool spaces and/or improve compressor efficiency. They often use potable water in substantial volumes. Managing the scaling effects and biological pollution of such water is a significant challenge. In locations where both humid and dry conditions occur, evaporative chillers are less effective. Standard liquid desiccant solutions do not operate well under those conditions. As disclosed herein, water addition can be used to simplify liquid desiccant systems and make them competitive in both dry and humid conditions. Many buildings have to deal with a variety of conditions from very hot and dry to relatively cool and humid. Buildings with high dew point (DP)/high relative humidity (RH) and high dry bulb (DB)/low DP, design points require costly conventional solutions, including technologies like solid desiccant wheels, heat pipes and hot gas reheat. Liquid desiccant systems disclosed herein can handle these conditions effectively.

There remains a large and increasing need to provide a retrofittable, cost effective, and efficient cooling system that can handle both high humidity loads with low sensible loads, as well as high sensible loads with low humidity loads for both cooling and heating. For example, existing liquid desiccant systems manage sensible loads by adding sensible cooling coils or "heat dumps" to the condenser. There are limits to the range of conditions each of these solutions can manage. This forces suppliers to offer a wide range of solutions for buildings with different design conditions in terms of outside air conditions and thermal/latent loads. We will disclose how a straight forward combination of the special dehumidification coil disclosed in U.S. Patent Application Publication No. 2016-0187011 and water addition disclosed in U.S. Patent Application Publication No. 2015-0338140 to the liquid desiccant systems disclosed in U.S. Pat. No. 9,243,810, U.S. Patent Application Publication No. 2014-0260399, etc. creates a compact system that can operate with superior efficiency and capacity over a very wide range of applications and design requirements. This includes making use of available exhaust air for energy recovery, which requires additional heat exchangers, or solid desiccant wheels in traditional systems, while liquid desiccant systems can recover much of the available latent and sensible potential of exhaust air without additional components.

Earlier work by among others Oakridge National Lab has demonstrated the effectiveness of using liquid desiccant to store energy, in particular dehumidification capacity. Increasing the concentration of liquid desiccant from 20% to 35-40% reduces the volume of the liquid desiccant. For each lb. of liquid desiccant in the concentrated solution 2-3 lbs. of water can be removed from air. Typically, dehumidification involves removing up to 0.005 to 0.01 lb. of water per lb. of air. 1 lb of liquid desiccant in a liquid desiccant solution has a total weight of 2.5 lb. at 40% and 5 lb. at 20%.

A 10 Ton system doing 1500 cfm requires about 25 liters of additional tank space and 10 l of desiccant to be able to dehumidify 920A air to 55F DP per hour. Or about 1 l of 100% liquid desiccant per ton per hour storage capacity. 1 liter of liquid desiccant provides the equivalent of 15 kWh of cooling capacity or 3-5 kWh of compressor dehumidification capacity. At a cost of $10 per liter liquid desiccant, the cost per kWh of latent storage capacity is $2-3 for the liquid desiccant and $3+ for the complete storage system.

In heat driven desiccant enabled evaporative cooling systems, concentrated liquid desiccant is used to reach the desired DP from any point on the psychrometric chart. The liquid desiccant is cooled with an indirect evaporative cooler or cooling tower. The cooled liquid desiccant achieves the desired DP condition at higher RH levels and with less concentrated desiccant then uncooled liquid desiccant Such a system uses heat for the regeneration of the desiccant, and water for cooling. Heat is not always available, e.g., solar heat is only available during the day. Cogeneration heat is only available when there is demand for power. District heating may have heat available continuously; however, rejecting it may be most critical during peak power demands for the utility.

Over concentrating the liquid desiccant to 40-45% and using more liquid desiccant to increase storage capacity make it possible to use the extra heat to prepare concentrated liquid desiccant and use it when the dehumidification capacity is required with significant savings from not having to generate heat during period in which sensible cooling is not required.

In a compressor based liquid desiccant system, savings come from the heat pump with a smaller lift thus improving its efficiency. Additional dehumidification capacity in itself does not immediately reduce energy requirement. Adiabatic dehumidification does not change the air enthalpy. This means that the amount of kWh required to go to a target temperature like 70/55 Fdp from 80F wet bulb (WB) is the same at 20% RH as at 95% RH. Therefore, the cooling load in a compressor-based system is not always reduced by the storage. In accordance with one or more embodiments, compressor use is optimized over the day by using liquid desiccant storage and thereby improve compressor efficiency.

BRIEF SUMMARY

A liquid desiccant air-conditioning system in accordance with one or more embodiments includes (a) a first liquid desiccant unit, (b) a second liquid desiccant unit, wherein one of said first and second liquid desiccant units is a conditioner and the other of said first and second liquid desiccant units is a regenerator, (c) a stratified liquid desiccant tank; and (d) a transfer system for transferring liquid desiccant among the first liquid desiccant unit, the second liquid desiccant unit, and the liquid desiccant tank. The transfer system comprises: a first conduit coupled to the liquid desiccant tank and the first liquid desiccant unit for transferring liquid desiccant from a lower portion of the liquid desiccant tank to the first liquid desiccant unit; a second conduit coupled to the first liquid desiccant unit and the second liquid desiccant unit for transferring liquid desiccant from the first liquid desiccant unit to the second liquid desiccant unit; a third conduit coupled to the second liquid desiccant unit and the liquid desiccant tank for transferring liquid desiccant from the second liquid desiccant unit to the liquid desiccant tank; a bypass valve in the second conduit; a fourth conduit coupled the bypass valve and the liquid desiccant tank for transfer of liquid desiccant between the second conduit and the liquid desiccant tank; and one or more pumps associated with at least one of the conduits for pumping liquid desiccant therethrough. The system also includes (e) a heat exchanger coupled to two of said conduits for exchanging heat between the liquid desiccant flowing in one conduit and liquid desiccant flowing in the other conduit.

A liquid desiccant air-conditioning system in accordance with one or more further embodiments includes: (a) a first liquid desiccant unit, (b) a second liquid desiccant unit, wherein one of said first and second liquid desiccant units is a conditioner and the other of said first and second liquid desiccant units is a regenerator; (c) a first stratified liquid desiccant tank; (d) a second stratified liquid desiccant tank, and (e) a transfer system for transferring liquid desiccant among the first liquid desiccant unit, the second liquid desiccant unit, the first liquid desiccant tank and the second liquid desiccant tank. The transfer system comprises: a first conduit coupled to the first liquid desiccant tank and the first liquid desiccant unit for transferring liquid desiccant from a lower portion of the first liquid desiccant tank to the first liquid desiccant unit; a second conduit coupled to the first liquid desiccant unit and the first liquid desiccant tank for transferring liquid desiccant from the first liquid desiccant unit to the first liquid desiccant tank; a third conduit coupled to the first liquid desiccant tank and the second liquid desiccant tank for transferring liquid desiccant from an upper portion of the first liquid desiccant tank to an upper portion of the second liquid desiccant tank; a fourth conduit coupled to the first liquid desiccant tank and to the second liquid desiccant tank for transferring liquid desiccant from a lower portion of the second liquid desiccant tank to a lower portion of the first liquid desiccant tank; a fifth conduit coupled to the second liquid desiccant tank and the second liquid desiccant unit for transferring liquid desiccant from an upper portion of the second liquid desiccant tank to the second liquid desiccant unit; a sixth conduit coupled to the second liquid desiccant unit and the second liquid desiccant tank for transferring liquid desiccant from the second liquid desiccant unit to a lower portion of the second liquid desiccant tank; and one or more pumps associated with at least one of the conduits for pumping liquid desiccant therethrough. The system also includes (f) a heat exchanger coupled to the third conduit and to the fourth conduit for exchanging heat between the liquid desiccant in the third conduit and the liquid desiccant in the fourth conduit.

A liquid desiccant air-conditioning system in accordance with one or more embodiments includes: (a) a first liquid desiccant unit, (b) a second liquid desiccant unit, wherein one of said first and second liquid desiccant units is a conditioner and the other of said first and second liquid desiccant units is a regenerator, (c) a liquid desiccant tank, (d) a liquid desiccant heat exchanger in the liquid desiccant tank, and (e) a transfer system for transferring liquid desiccant among the first liquid desiccant unit, the second liquid desiccant unit, and the liquid desiccant tank. The transfer system comprises: a first conduit coupled to the liquid desiccant tank and the first liquid desiccant unit for transferring liquid desiccant from a lower portion of the liquid desiccant tank to the first liquid desiccant unit; a second conduit coupled to the first liquid desiccant unit and the liquid desiccant heat exchanger for transferring liquid desiccant from the first liquid desiccant unit to a first inlet in the liquid desiccant heat exchanger; a third conduit coupled to the second liquid desiccant unit and the liquid desiccant heat exchanger in the liquid desiccant tank for transferring liquid desiccant from the liquid desiccant heat exchanger to the second liquid desiccant unit; a fourth conduit coupled to the second liquid desiccant unit and the liquid desiccant heat exchanger for transferring liquid desiccant from the second liquid desiccant unit to a second inlet in the liquid desiccant heat exchanger; and one or more pumps associated with at least one of the conduits for pumping liquid desiccant therethrough; and wherein the liquid desiccant heat exchanger exchanges heat between the liquid desiccant received from the second liquid desiccant unit and the liquid desiccant received from the first liquid desiccant unit.

A liquid desiccant air-conditioning system in accordance with one or more further embodiments includes: (a) a first liquid desiccant unit, (b) a second liquid desiccant unit, wherein one of said first and second liquid desiccant units is a conditioner and the other of said first and second liquid desiccant units is a regenerator, (c) a liquid desiccant tank, (d) a high concentration stratified liquid desiccant sub-tank in the liquid desiccant tank configured to overflow into the liquid desiccant tank, (e) a low concentration stratified liquid desiccant sub-tank in the liquid desiccant tank configured to overflow into the liquid desiccant tank, and (e) a transfer system for transferring liquid desiccant among the first liquid desiccant unit, the second liquid desiccant unit, the liquid desiccant tank, the high concentration sub-tank. The low concentrations sub-tank said transfer system comprises a first conduit coupled to the liquid desiccant tank and the first liquid desiccant unit for transferring liquid desiccant from a lower portion of the liquid desiccant tank to the first liquid desiccant unit; a second conduit coupled to the first liquid desiccant unit and the low concentration liquid desiccant sub-tank for transferring liquid desiccant from the first liquid desiccant unit to the low concentration liquid desiccant sub-tank; a third conduit coupled to the second liquid desiccant unit and the low concentration liquid desiccant sub-tank for transferring liquid desiccant from the low concentration liquid desiccant sub-tank to the second liquid desiccant unit; a fourth conduit coupled to the second liquid desiccant unit and the high concentration liquid desiccant sub-tank for transferring liquid desiccant from the second liquid desiccant unit to high concentration liquid desiccant sub-tank; and one or more pumps associated with at least one of the conduits for pumping liquid desiccant therethrough.

A method of operating a liquid desiccant air conditioning system is also disclosed in accordance with one or more embodiments. The system includes a conditioner, a regenerator, at least one stratified liquid desiccant tank, and a transfer system for controllably transferring liquid desiccant among the conditioner, the regenerator, and the at least one liquid desiccant tank. The method includes the steps of: (a) when outside air is warm and has low relative humidity: (i) dehumidifying an air stream to be provided to a building space by the conditioner using concentrated liquid desiccant; (ii) providing dilute liquid desiccant used in the conditioner to the regenerator; (iii) concentrating the liquid desiccant received in (ii) by the regenerator; (iv) returning a portion of the liquid desiccant concentrated in (iii) to the conditioner and storing another portion in the at least one stratified liquid desiccant tank; (b) when outside air is cool and has high relative humidity: (i) providing liquid desiccant concentrated by the regenerator during (a) from the at least one stratified liquid desiccant tank to the conditioner; and (ii) utilizing the conditioner to dehumidify an air stream to be provided to the space using concentrated liquid desiccant received in (i); and (c) periodically repeating steps (a) and (b).

DETAILED DESCRIPTION

Figure 1:
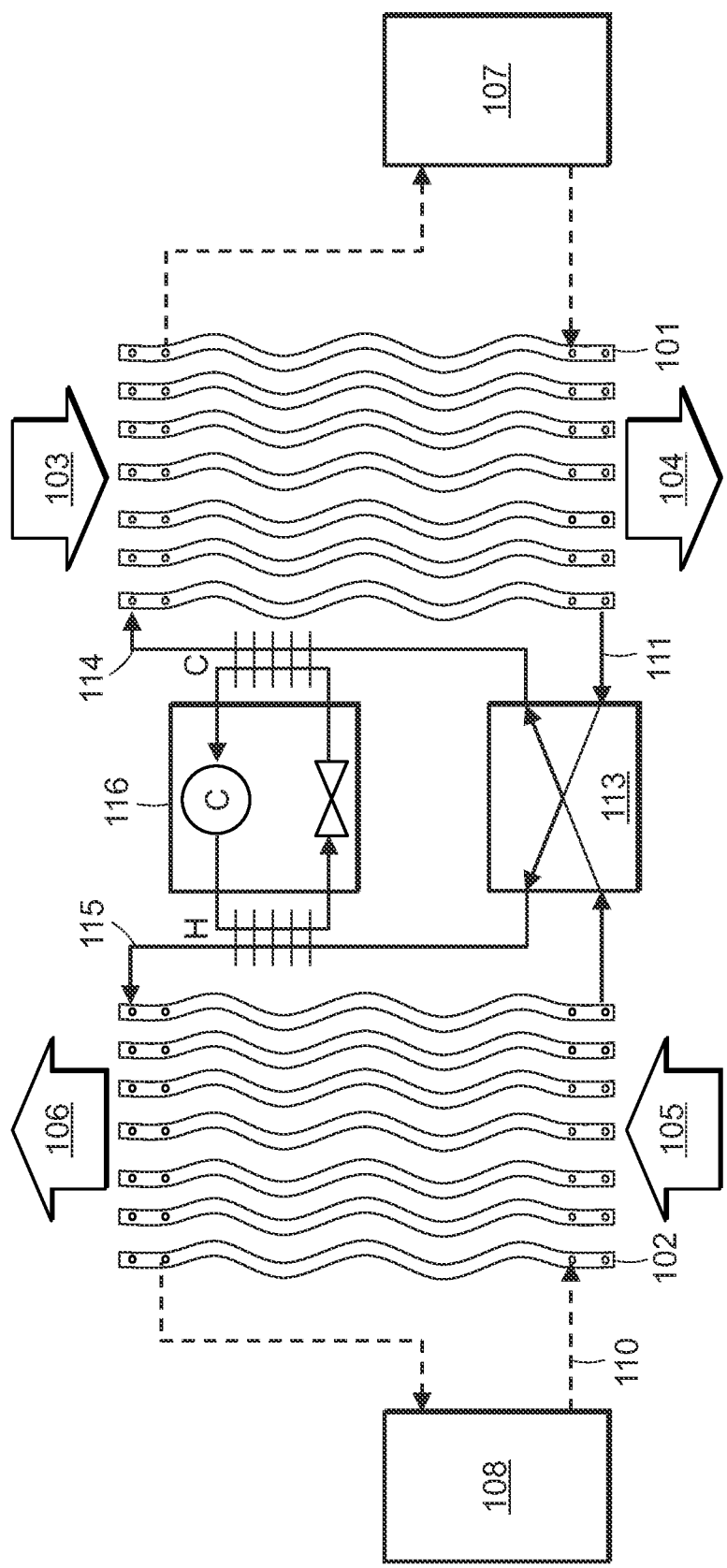
FIG. 1 illustrates an exemplary 3-way liquid desiccant air conditioning system using a chiller or external heating or cooling sources.

FIG. 1 depicts a new type of liquid desiccant system, as described in more detail in U.S. Pat. No. 9,243,810, which is incorporated by reference herein. A conditioner 101 comprises a set of plate structures that are internally hollow. A cold heat transfer fluid is generated in cold source 107 and entered into the plates. Liquid desiccant solution at 114 runs down the outer surface of each of the plates. The liquid desiccant runs behind a thin membrane that is located between the air flow and the surface of the plates. Outside air at 103 is blown through the set of conditioner plates, which are wavy shaped in this example. The liquid desiccant on the surface of the plates attracts the water vapor in the air flow and the cooling water inside the plates helps to inhibit the air temperature from rising. The treated air at 104 is put into a building space.

The liquid desiccant is collected at the bottom of the wavy conditioner plates at 111 and is transported through a heat exchanger 113, to the top of the regenerator 102, and to point 115 where the liquid desiccant is distributed across the wavy plates of the regenerator. Return air, or optionally outside air, at 105 is blown across the regenerator plate and water vapor is transported from the liquid desiccant into the leaving air stream at 106. An optional heat source 108 provides the driving force for the regeneration. The hot transfer fluid at 110 from the heat source can be put inside the wavy plates of the regenerator similar to the cold heat transfer fluid on the conditioner. Again, the liquid desiccant is collected at the bottom of the wavy plates 102 without the need for either a collection pan or bath, so the regenerator the air flow can be horizontal or vertical. An optional heat pump 116 can be used to provide cooling and heating of the liquid desiccant. It is also possible to connect a heat pump between the cold source 107 and the hot source 108, which is pumping heat from the cooling fluids rather than the desiccant.

Figure 2:
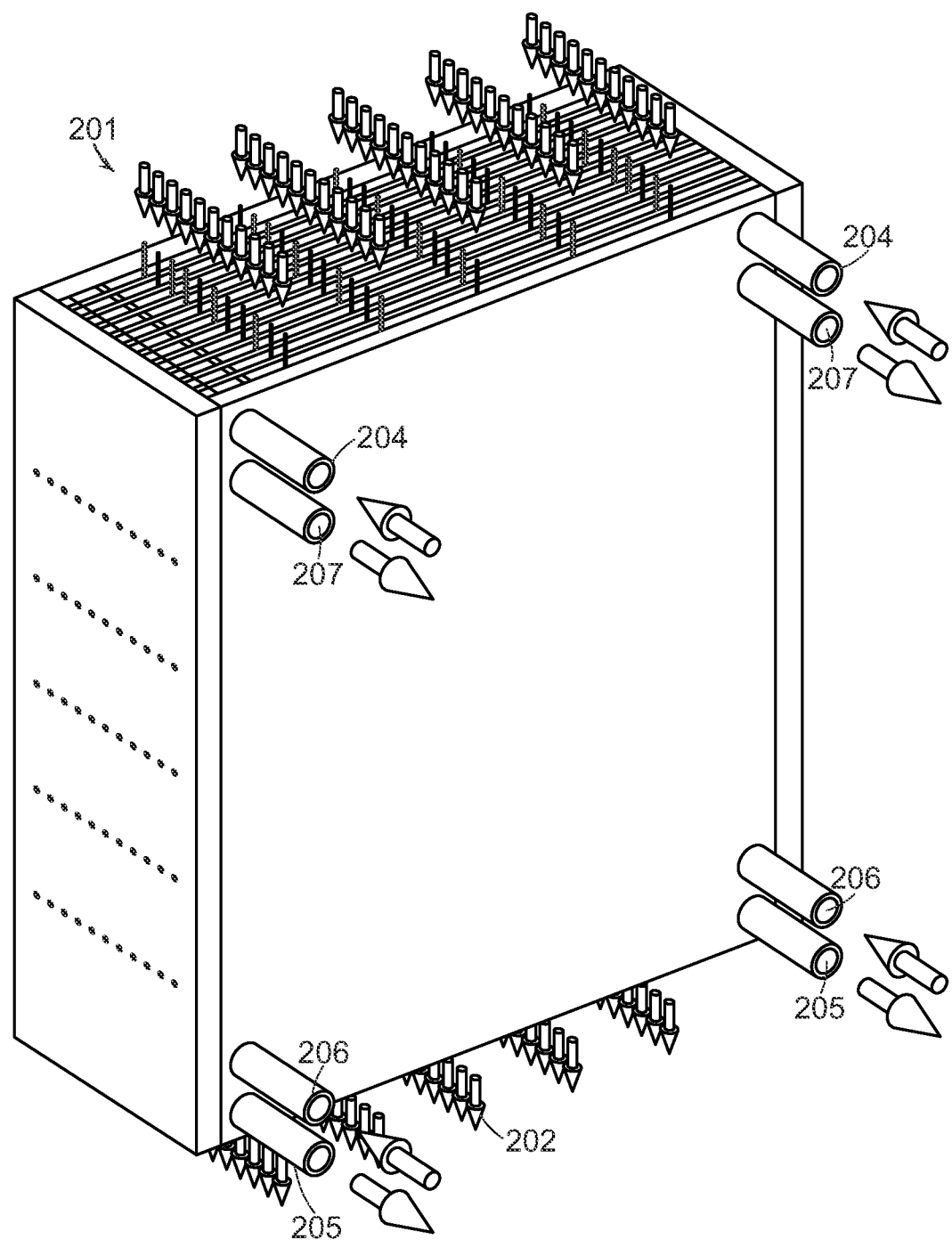
FIG. 2 shows an exemplary flexibly configurable membrane module that incorporates 3-way liquid desiccant plates.

FIG. 2 describes a 3-way heat exchanger as described in further detail in U.S. Pat. Nos. 9,308,490; 9,101,874; and 9,101,875, all of which are all incorporated by reference herein. A liquid desiccant enters the structure through ports 204 and is directed behind a series of membranes as described in FIG. 1. The liquid desiccant is collected and removed through ports 205. A cooling or heating fluid is provided through ports 206 and runs counter to the air stream at 201 inside the hollow plate structures, again as described in FIG. 1 and in more detail in FIG. 2. The cooling or heating fluids exit through ports 207. The treated air at 202 is directed to a space in a building or is exhausted as the case may be. The figure illustrates a 3-way heat exchanger in which the air and heat transfer fluid are in a primarily vertical orientation. It is however also possible to configure the heat exchanger such that the air and the heat transfer fluid flow in other directions, e.g., a horizontal direction.

Figure 3:
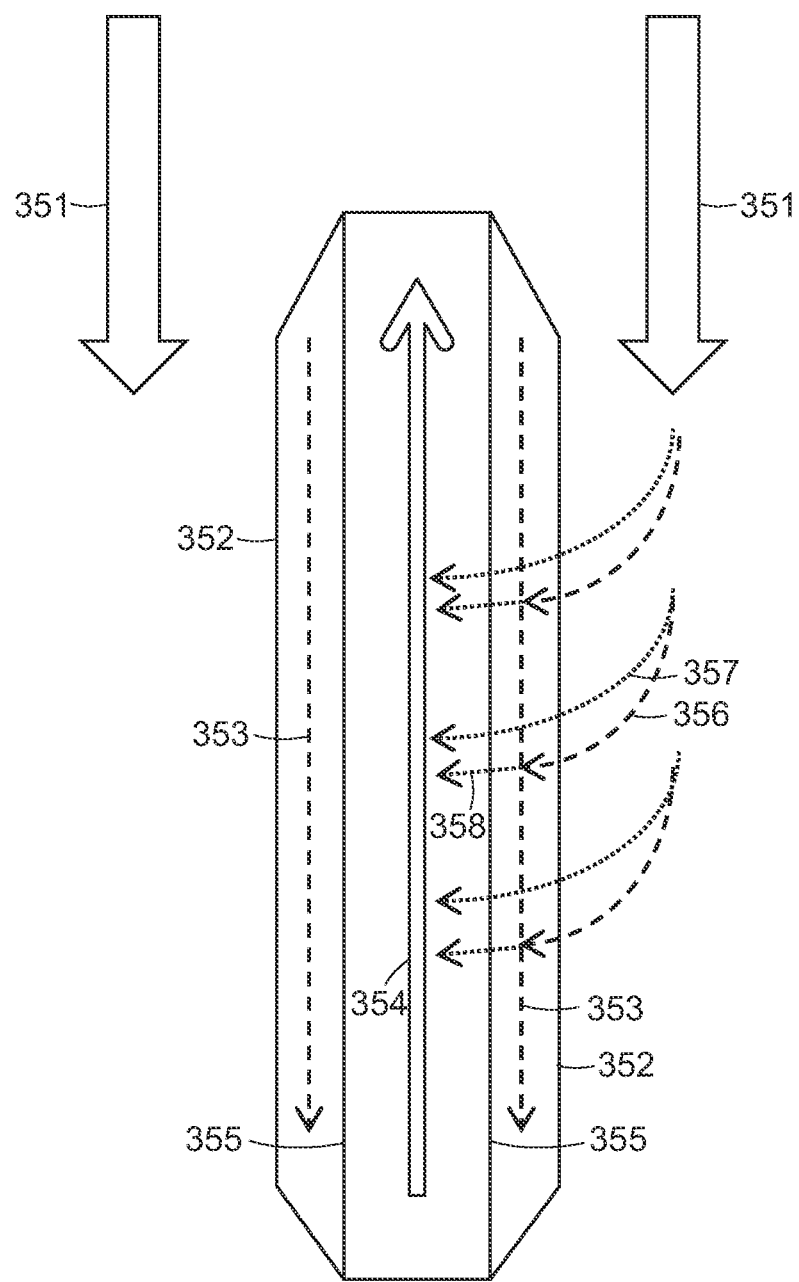
FIG. 3 illustrates an exemplary single membrane plate in the liquid desiccant membrane module of FIG. 2.

FIG. 3 describes a 3-way heat exchanger as described in more detail in U.S. Pat. No. 9,631,848, which is incorporated by reference herein. The air stream at 351 flows counter to a cooling fluid stream at 354. Membranes 352 contain a liquid desiccant at 353 that is flowing along the wall 355 that contains a heat transfer fluid at 354. Water vapor at 356 entrained in the air stream is able to transition through the membrane 352 and is absorbed into the liquid desiccant at 353. The heat of condensation of water at 358 that is released during the absorption is conducted through the wall 355 into the heat transfer fluid at 354. Sensible heat at 357 from the air stream is also conducted through the membrane 352, liquid desiccant at 353 and wall 355 into the heat transfer fluid at 354. This warms up the liquid desiccant 358 which is then transferred to the heat transfer fluid 354. The heat transfer fluid also cools the air sensibly to the required target condition. The ratio of latent versus sensible cooling is determined by the concentration of the liquid desiccant 353. During dehumidification concentrated desiccant enters the panel where it is diluted. And cold heat transfer fluid enters the panel where it is warmed up.

These figures show how the panels are built into modules (FIG. 3) with the air 351 flowing through it horizontally or vertically. Desiccant enters at the top of the module and flows through the panel exiting at the bottom. Heat transfer fluid 354 flows counter to the airflow entering through the bottom and exiting through the top.

Figure 4:
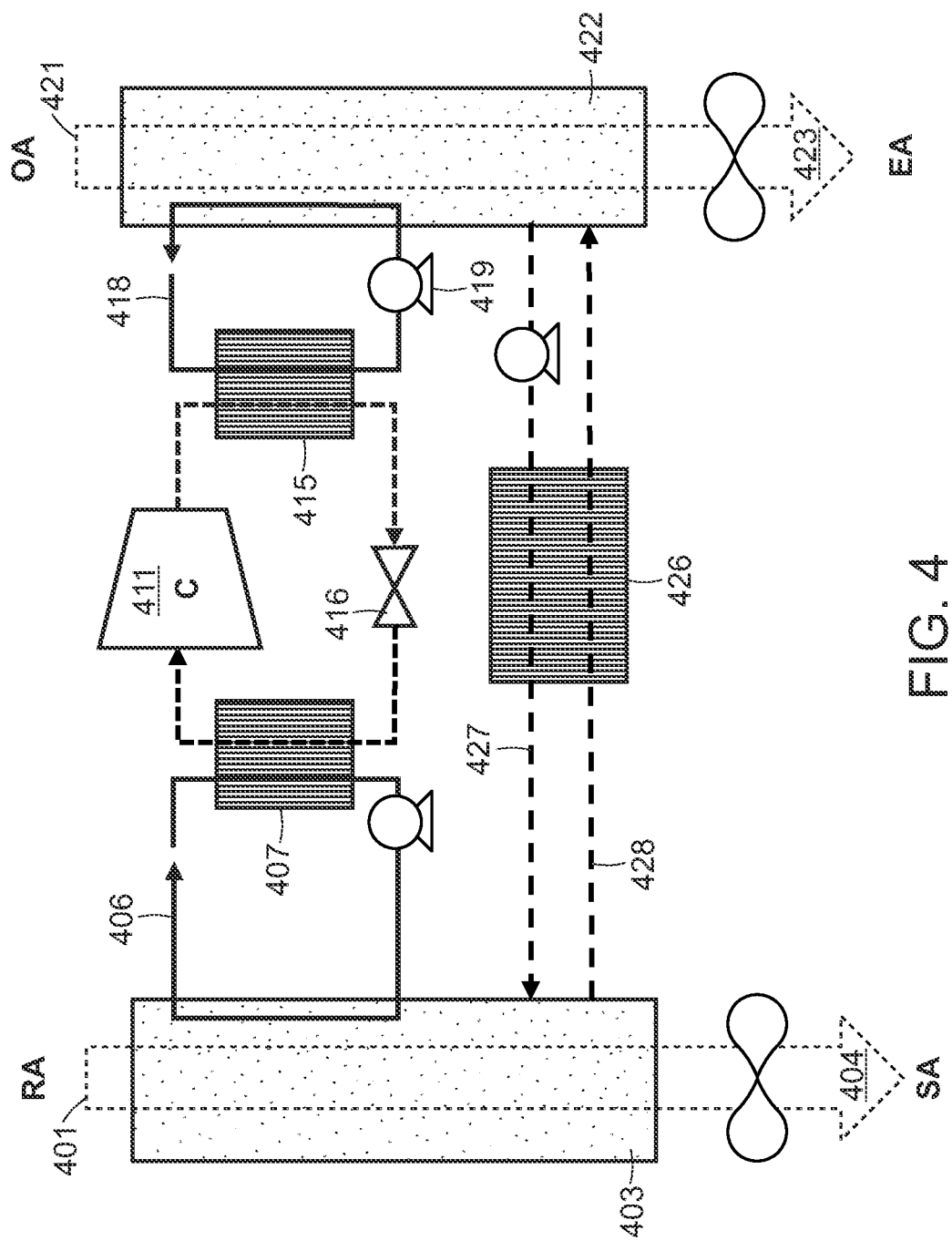
FIG. 4 shows an exemplary liquid desiccant air conditioning system with a compressor and heat exchangers configured to operate in a cooling mode.

FIG. 4 shows a liquid desiccant air conditioning system having a conditioner 403 and a regenerator 422 operating in a cooling mode. Diluted liquid desiccant 428 from conditioner 403 is pumped through a heat exchanger 426 to the regenerator 422, which comprises similar panel modules as the conditioner 403. A heat transfer fluid 418 from the regenerator 419 is heated by the condenser side of a compressor system 411 through a heat exchanger 415. As a result, the air 421 entering the regenerator 422 is heated and humidified and exits at 423.

Heat exchanger 426 warms up the liquid desiccant 428 using the heat from the concentrated desiccant 427 that has just been warmed up in regenerator 422.

The heat transfer fluid may comprise water or water and glycol. The heat transfer fluid 406 exiting the conditioner 403 is cooled by refrigerant to heat transfer fluid heat exchanger 407. The heat transfer fluid 418 from the regenerator 422 is heated up in the refrigerant-to-water heat exchanger 415.

Where the panels incorporate refrigerant as heat transfer fluid heat exchangers 407 and 415 are not used, instead the panels are cooled directly as shown, e.g., in FIG. 1.

Conditioner 403 conditions a mix of outside and return air 401 to supply air 404. The regenerator uses a mix of exhaust air and outside air 421 to regenerate the liquid desiccant, exhausting humid and hot air 423. As is shown in prior art the compressor system 411 with expansion valve 416 may have other components including air cooled coils and accumulators which are not shown.

Figure 5:
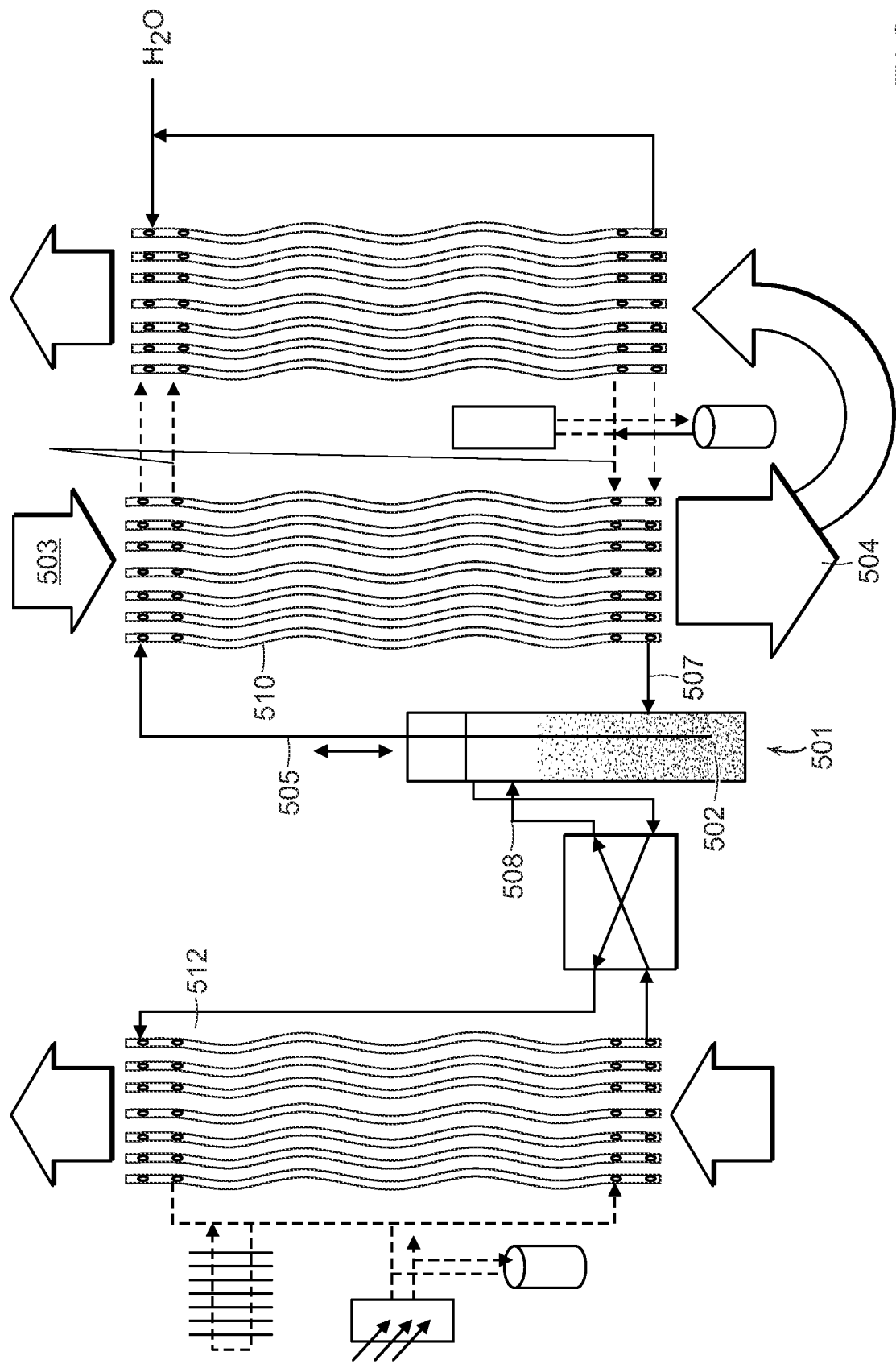
FIG. 5 shows an exemplary liquid desiccant air conditioning system with a stratified liquid desiccant tank.

FIG. 5 shows a liquid desiccant air conditioning system with a stratified liquid desiccant tank 501 as described in further detail in U.S. Pat. No. 9,086,223, which is incorporated by reference herein. Concentrated liquid desiccant has a higher specific weight than more diluted liquid desiccant. As a result, liquid desiccant in a standing tank will leave the weaker desiccant at the top of the tank. Such a tank can be used to use more or less concentrated liquid desiccant for the processing of air 503 in the conditioner 510, depending on the humidity targets for supply air 504. This requires monitoring the concentration of the desiccant through the level of the tank 501, since more diluted liquid desiccant has a higher volume than concentrated liquid desiccant.

Given time to settle, this will enable the system to draw concentrated desiccant 505 for the conditioner, e.g., by using device 502 during cooling from the bottom of the tank and draw diluted desiccant from the top of the tank. Though not shown in the dwg, since separation takes time its advantageous to return concentrated desiccant 508 from the regenerator 512 to the bottom of the tank and more diluted desiccant from the conditioner to the top of the tank 507, or to take one of those flows and directly connect the conditioner and the regenerator.

Tank 501 fulfills multiple functions in the system:

As the desiccant is diluted it expands and the tank contains the additional volume Stratification allows some differentiation of the concentration by selecting the point where the liquid desiccant is drawn from During maintenance, the desiccant from the removed panels can flow back into the tank When conditioner and regenerator flows are not the same, the tank absorbs the difference The tank can provide an air reference to the panels preventing over pressurization of the panel Desiccant can have air-bubbles coming out of the panels and the tank can de-aerate the desiccant, which may be significant for predictable and measurable flows.

Figure 6:
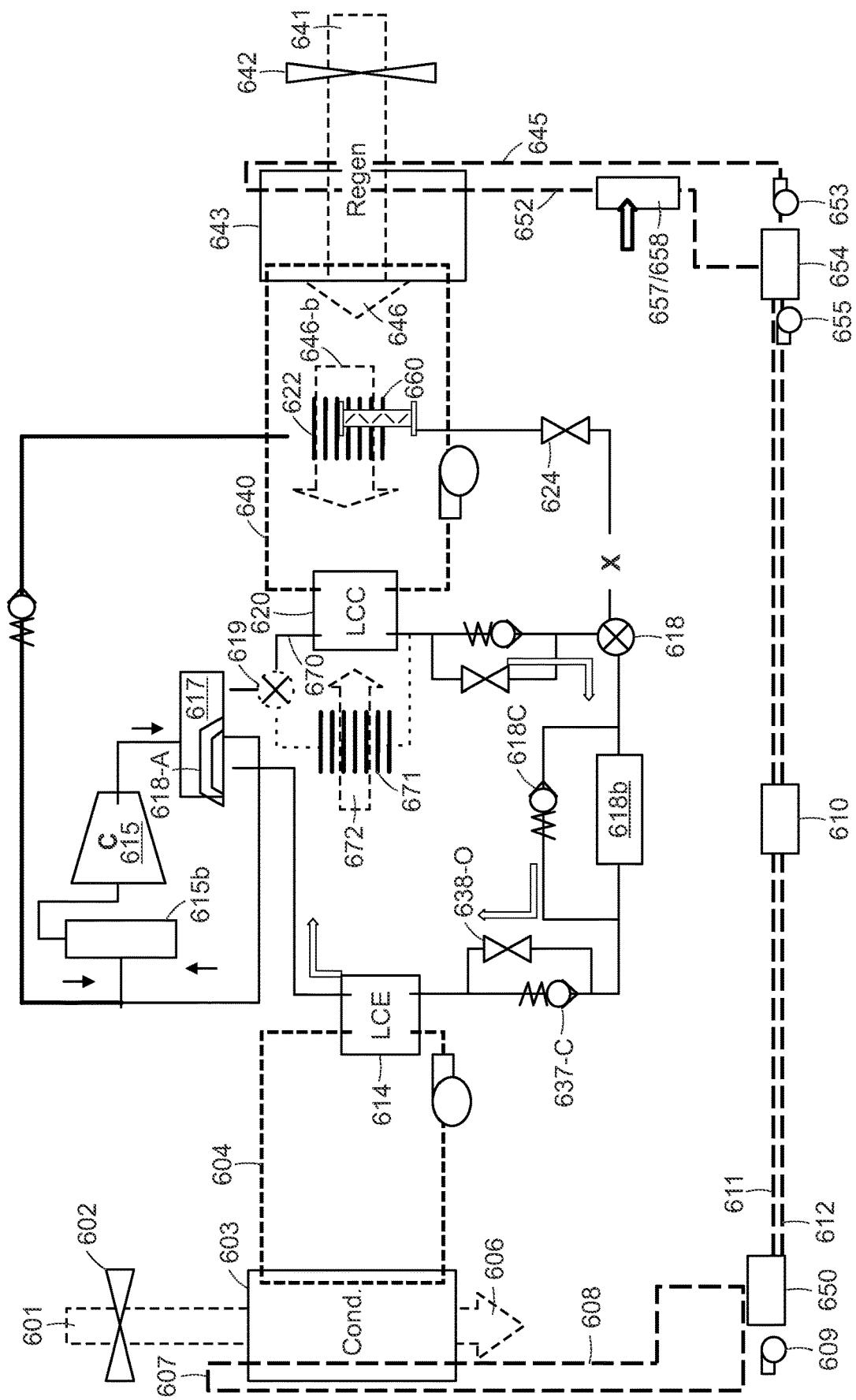
FIG. 6 illustrates an exemplary liquid desiccant air conditioning system in accordance with one or more embodiments, including a dual tank system with multiple pumps.

The multi pump system FIG. 6 disclosed in U.S. Patent Application No. 62/580,270, which is incorporated by reference, shows multiple tanks and pumps for managing the desiccant in a liquid desiccant air conditioning system. We will show how such a system can be optimized. The liquid desiccant 607 entering the conditioner 603 is pumped by pump 609 from the tank 650 to the conditioner 603 and returns liquid desiccant 608 to the tank 650. The conditioner conditions air 601 supplied by fan 602 to the conditions required for supply air 606. The desiccant to the regenerator 648 is pumped from a second tank 654 through the regenerator 653, which uses air 641 supplied by fan 642 to regenerate the liquid desiccant before it as 652 returned to the tank 654. Additional pumps like 655 can be used to pump desiccant from tank 654 to 650 and vice versa. Heat exchanger 610 warms up the cold desiccant 611 and cools the hot desiccant 612 to minimize a heat loss between conditioner and regenerator. The volume of liquid desiccant can also be influenced through direct water addition 657 through a module 658.

FIG. 6 further shows how compressor 615 can be used as a source of cold water 604 and hot water 640 through liquid to water heat exchangers 614 and 620, respectively, with the system set by switch 617 in cooling mode 618A. Other coils 671 and 622 using air flows 672 and 646 are shown, which are relevant for managing the concentration by shifting part of the condenser load from the regenerator to coil 671 to avoid overconcentrating the desiccant. Or by using coil 622 to generate additional load using expansion valve 624 when valve 618 is set for adiabatic or near adiabatic dehumidification during cool conditions. The system shown in FIG. 6 is a complex heat pump configuration with multiple one-way valves like 637 and 618 which is shown in 'C' or closed position to activate expansion valve 638. Accumulator 618 can used to balance the refrigerant charge during the different settings of the heat pump. Liquid desiccant is used in the conditioner 603 to condition the air 601, typically reducing the humidity during the cooling of humid air and increasing the humidity during heating of air. As a result, the regeneration tank 654 maintains a higher temperature and the cooling tank 650 maintains a lower temperature while operating in cooling mode. This is reversed in heating mode.

The liquid desiccant system in FIG. 6 is one possible configuration of hot and cold sources, which can be used in multiple modes of operation. Typically cooling and dehumidification and heating with some humidification are part of the standard operating modes for liquid desiccant heat pump systems. Warming the air while dehumidifying is a requirement in some applications e.g. with very humid but cool air, e.g. 65F at 90% RH. As concentrations of the liquid desiccant vary and the effectiveness of full regeneration is impacted by compressor loads and outside air conditions. This disclosure will show how tanks 650 and 654 can be used to manage such conditions without or with minimal use of the air-cooled coils 622 and 671, simplifying controls, reducing system costs and improving system efficiency especially when the additional loads created by 622 can be avoided when adiabatically dehumidifying already cool but humid air 601.

Humidification during cooling can be a benefit during cooling of very dry air, e.g. desert air at a DP below 40F with a temperature of over 35C. It improves comfort but also fundamentally changes cooling loads as the cooling can be done partially adiabatically. The water addition module 657 can play a key role in achieving this. But it also influences the size and shape of the tanks system. If an application requires a broad range of concentrations for the liquid desiccant, then the tank size should accommodate the additional volume required to reduce the volume from the highest to the lowest concentration. The tank level itself is a measure of the concentration of the liquid desiccant. In standard tanks, the relationship between concentration and tank level is not linear, requiring some adjustment in the controls or settings to accommodate for that.

The ability to control desiccant concentration through the addition of water through 657 reduces the range of concentrations the tank(s) 650 and/or 654 have to accommodate. As a result, a system with water addition requires smaller tanks than systems that manage dry conditions with air-cooled coils and varying concentration levels.

The concentration of liquid desiccant for a specific application depends on the relative humidity needed for the supply air. The precise concentration depends on the desiccant used. To achieve a supply RH of 40% to 60% with LiCl requires concentrations of 20% to 35%. A concentration of X will give an RH-supply=100%−2x+F1 (latent effectiveness) at the conditioner where x is the concentration in % and F is a function of the latent effectiveness of the conditioner. For the regenerator, RH-out=100%−2x−F2 (latent effectiveness), where F2 is a function of the latent effectiveness of the regenerator. In general, F1>>F2. In other words, a higher concentration and thus a smaller tank is needed to achieve a maximum supply RH when the effectiveness of the liquid desiccant system is lower.

As the concentration of liquid desiccant drops, the total volume of liquid desiccant increases. Liquid desiccant at 20% has a 50% larger volume than liquid desiccant at 30%. The increase of the actual volume of liquid desiccant in the tank is even larger, since a significant portion of the desiccant resides in the panels and piping with a fixed volume. For the baseline configuration of FIG. 4, the RH of regenerator input air and the RH of conditioner supply air are closely linked. With the RH of the conditioner being lower than the RH of the regenerator supply air. However, the system shown in FIGS. 6 and 7 can actively manage the concentration of the liquid desiccant irrespective of input conditions.

Figure 7:
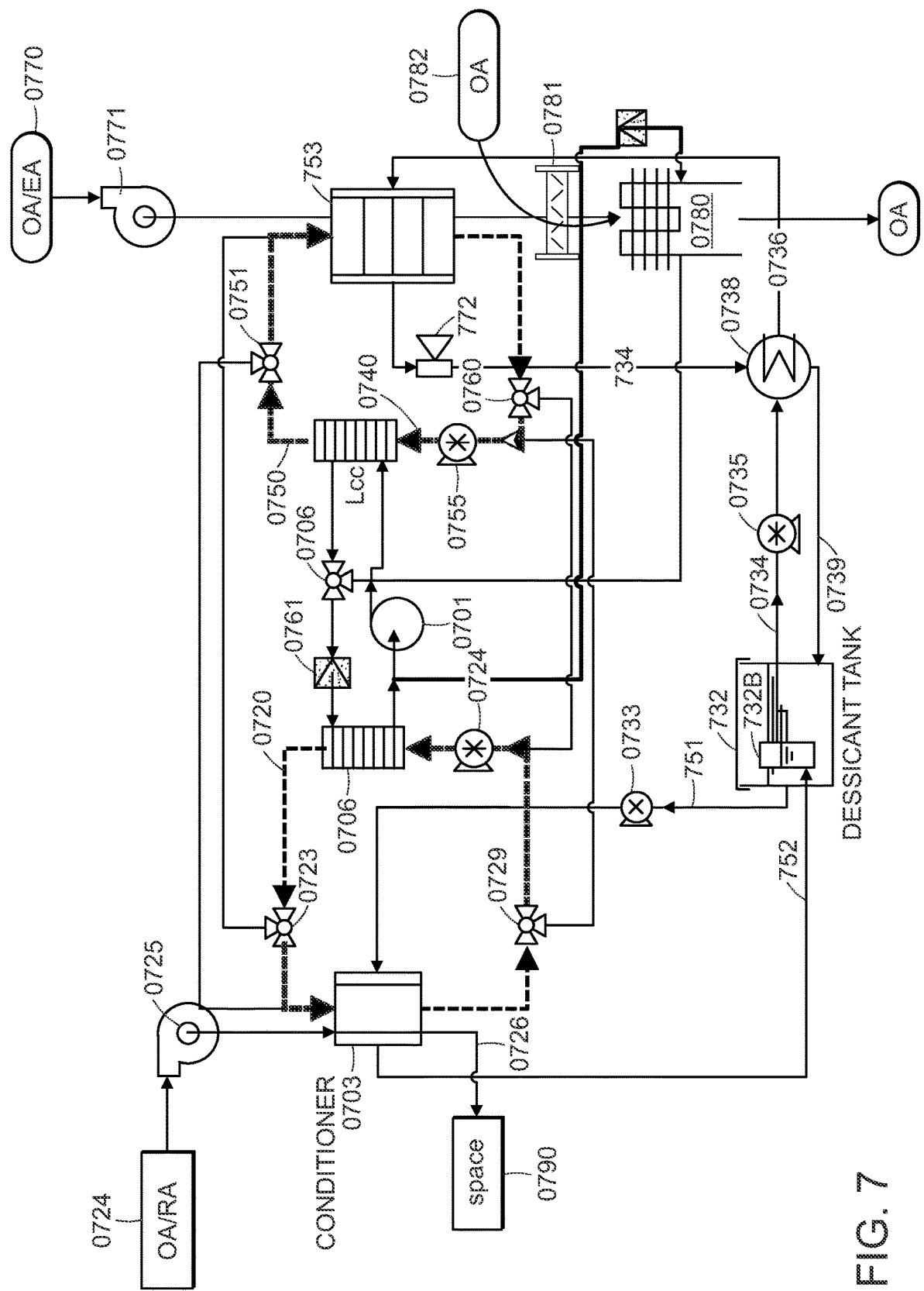
FIG. 7 illustrates an exemplary liquid desiccant air conditioning system in accordance with one or more embodiments, including features for managing liquid desiccant concentration.

FIGS. 6 and 7 show several ways in which the liquid desiccant concentration can be changed, including direction and flow of the refrigerant and the heat transfer fluid through valves 617, 618, 619 in FIG. 6 and valves 723, 729, 751, and 760 in FIG. 7. Also, desiccant and heat transfer fluid flow rates can be set by pumps 609, 655 and 653 in FIG. 6 and 733, 735, 724, and 755 in FIG. 7 with more flow through the regenerator and less through the conditioner increasing concentration in cooling mode. Airflow rates are driven by fans 602 and 642 and damper 660 in FIGS. 6 and 725, 771 and damper 781 in FIG. 7.

Water addition at 652 and 772 is the most direct way of reducing the concentration of the liquid desiccant. It also allows maintaining the concentration of liquid desiccant over a wide range of conditions. Since the size of the tank is driven by the ratio of the highest and lowest concentration used in the system, greater control over the concentration reduces the size required for the tank. Leading to a direct trade off in size and weight between liquid desiccant storage and concentration management components.

Water addition is the most direct control over liquid desiccant concentration. Additional sensible coils that add load to the evaporator and shift it from the regenerator directly influence energy available for concentrating liquid desiccant. These coils can be managed by shifting heat transfer fluids or by changing airflows through the coils. More air and cooler air increase the effectiveness of condenser coils, reducing concentration. More and dryer air increases the effectiveness of evaporator coils and thus increase concentration in both cooling and heating mode. Air flows through the regenerator determine whether the available energy can be used for increasing the concentration. Lower regenerator airflows increase this ability by heating up regenerator air which allows the air to absorb more humidity.

FIG. 7 shows a partitioned tank 732. During dehumidification, liquid desiccant 751 is pumped by 733 to conditioner 703 where it dehumidifies air 724 driven by fan 725 to be supplied to space 790. The conditioner 703 is cooled by heat transfer fluid 720 from the evaporator coil 706 cooled by the refrigerant through an expansion valve. The cool heat transfer fluid is pumped by pump 724 through conditioner 703 to process air 724 by fan 725 to supply space 790. The diluted desiccant 752 is then returned to sub-tank 732B. Pump 735 takes liquid desiccant 734 from a sub-tank 732B and pumps it through heat exchanger 738 from where the warmer liquid desiccant 736 is send to the regenerator 753 where it is reconcentrated by the air 770 from fan 771 while its heated by heat transfer fluid 750, from the liquid to refrigerant condenser coil 740 of chiller 701. The hot desiccant 737 is used in the heat exchanger 738 to warm up the desiccant 734 and returns as cooled down and concentrated desiccant 739 to the main tank 732. Pump 733 takes the concentrated desiccant from tank 732 and pumps it through conditioner 723 after which it returns 752 to tank sub-tank 732B.

How much condenser heat is available for regeneration can be influenced by air-cooled coils like 780 which are configured to use a combination of the air from regenerator 753 or outside air 782 by adjusting damper 781 to add load to compressor 701 during cool and humid conditions where the regenerator 753 needs more energy to fully regenerate the liquid desiccant to a high concentration. While a valve system like 706 can be used to reject some of the load of the condenser or add load to the evaporator.

Optimizing the performance of system such as are shown in FIGS. 6 and 7 is driven to a significant extend by minimizing the heat losses that occur when desiccant is moved from the regenerator to the conditioner and back. Heat exchangers 610 and 738 play a key role, but so do any heat losses from tanks 650 and 654. Keeping the tank temperature close to the ambient temperature of the space they are situated in helps improve overall system performance.

The liquid desiccant 739 after regeneration can have a 1-2% higher concentration than the liquid desiccant 752 from the conditioner. Mixing those two flows increases the workload for the compressor for a given target RH for supply air 726

Figure 8A:
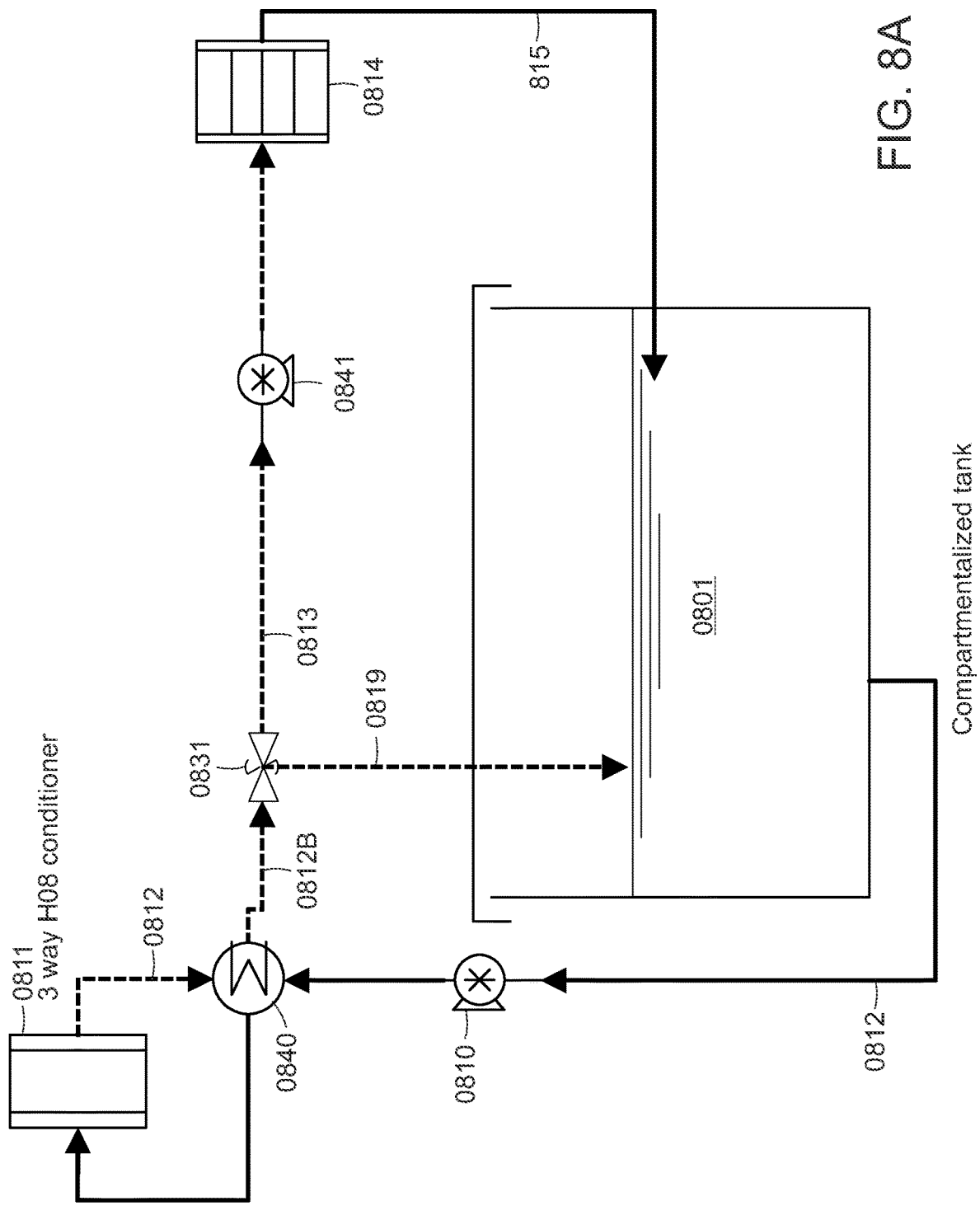
FIG. 8A illustrates an exemplary liquid desiccant air conditioning system in accordance with one or more embodiments, including a stratified tank with hot and concentrated desiccant, while diluted desiccant flows directly from the conditioner to the regenerator.
Figure 8B:
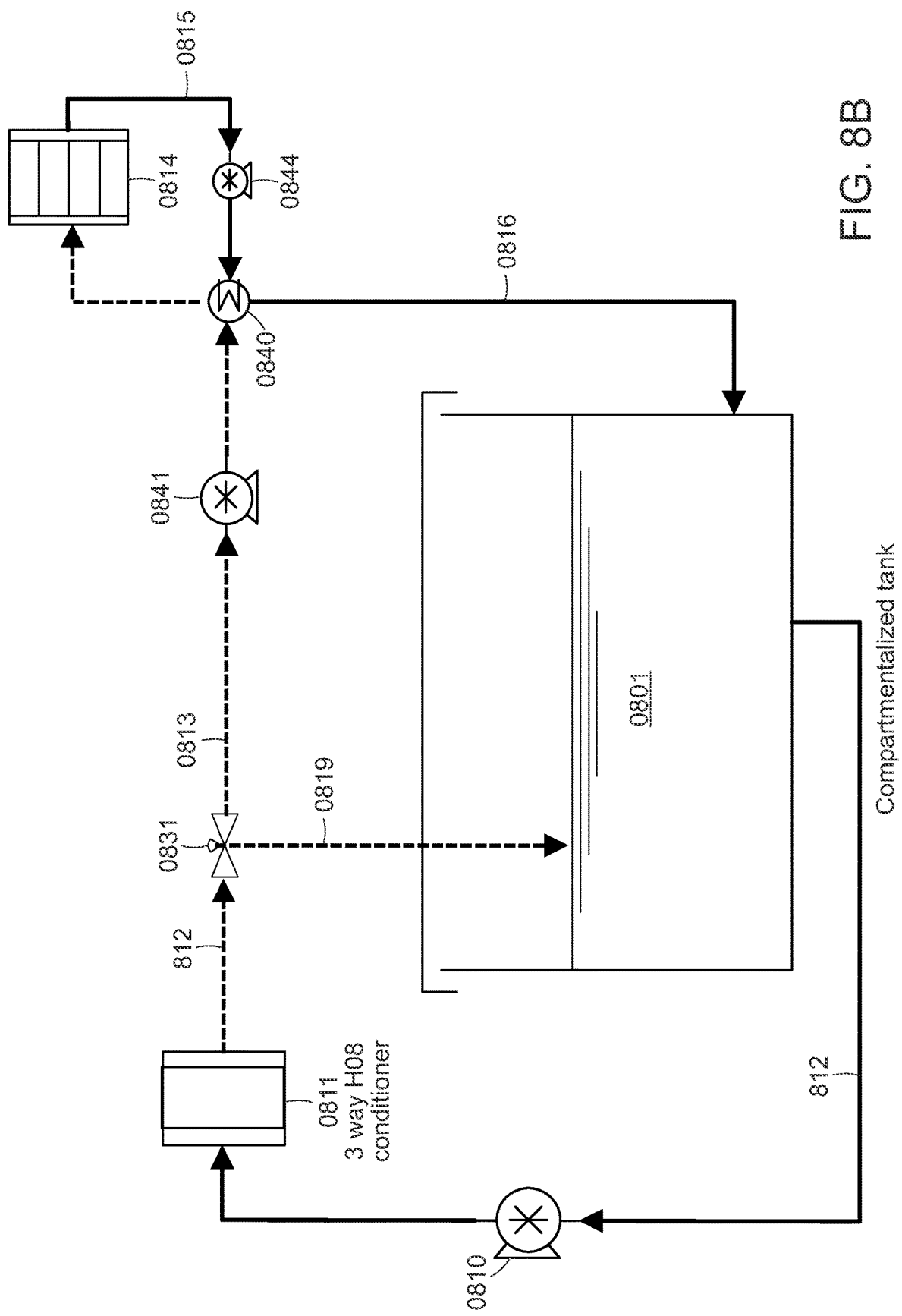
FIG. 8B illustrates an exemplary liquid desiccant air conditioning system in accordance with one or more embodiments, including a stratified tank with cool and concentrated desiccant, while diluted desiccant flows directly from the conditioner to the regenerator.

FIGS. 8A and 8B show how this can be managed with a single tank system, using the natural stratification of the desiccant in a tank with the heavier desiccant having the higher concentration.

FIG. 8A shows how concentrated desiccant 812 from the bottom of tank 801 is pumped by 810 via heat exchanger 840 to conditioner 811. The diluted cooled desiccant precools 812 in heat exchanger 840. Pump 841 pumps it through regenerator 814 back as 815 to tank 801. If pump 810 is not used or set at a lower volume, than pump 810, the valve system and overflow 831 returns the desiccant 819 to the tank. In this configuration, the tank is kept at temperature close to that of the regenerator, which can be useful if the tank is exposed to outside air conditions. The overflow shown here does not allow the regenerator to be run without the conditioner. That would require a separate supply to 841 from the top of the desiccant in 801. Or by using the dual tank system shown in FIG. 7.

FIG. 8A shows the heat exchanger 840 on the side of the conditioner where the tank temperature will be close to the regenerator temperature. FIG. 8B shows the liquid desiccant heat exchanger 840 on the side of regenerator 814, cooling down liquid desiccant 815 and warming up liquid desiccant 813. Tank 801 still holds the concentrated liquid desiccant but now at a lower temperature closer to that of the conditioned space, which could be applicable where the tank system is kept inside a building at close to building conditions and the regenerator is either located outside or receives its air via a duct.

Air is encapsulated in the desiccant flow in the membrane units 811 and 814, resulting in "bubbles" in the desiccant flow. This reduces the effectiveness of the heat exchanger 840. The tank de-aerates the desiccant. Locating the liquid desiccant heat exchanger 840 between a flow from the tank to the conditioner and the return flow from the conditioner, will be less impacted by bubble forming than when the heat exchanger 840 is located between desiccant coming directly from the conditioner and returning from the regenerator. In FIG. 8A, the desiccant 812 has been de-aerated while the flow 812B will have some encapsulated air. In FIG. 8B both flow 813 and flow 815 will have some encapsulated air. Therefore, a de-aeration device at or after overflow 831 would improve performance. In FIG. 7, sub-tank 732B acts as a de-aeration device. It will be understood to those skilled in the art that de-aeration can be achieved in a variety of ways in addition to using the tank.

Figure 9:
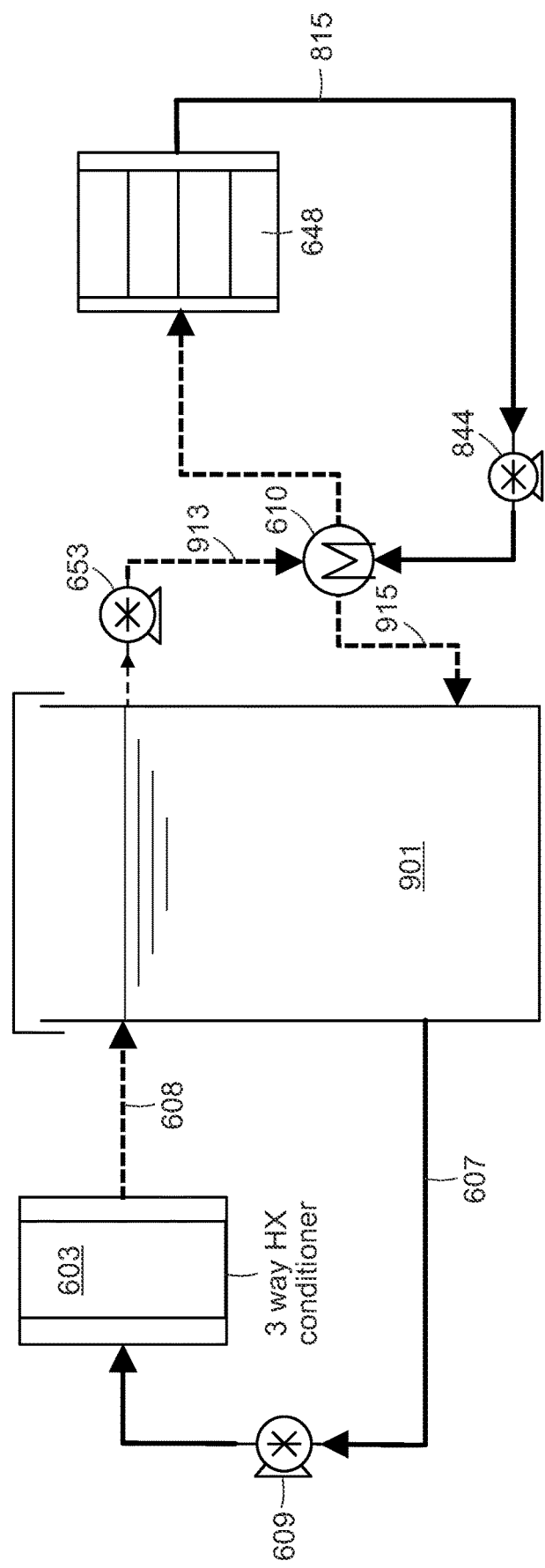
FIG. 9 illustrates an exemplary liquid desiccant air conditioning system in accordance with one or more embodiments, including a stratified tank with cool desiccant.

FIG. 9 shows a system with a single tank where pump 609 takes the concentrated and cooled desiccant 607 from the bottom of the tank 901 and supplies it to conditioner 603. The diluted desiccant 608 is returned to the top of the desiccant tank 901. Pump 653 takes diluted liquid desiccant 913 from the top of the tank 901, e.g., by using a floating suction system. Such a floating connection can take various forms which are not pertinent for the performance of the system. The concentrated desiccant is taken by pump 844 from the regenerator 648 and flows via heat exchanger 610 to 915 to tank 901. This system uses tank stratification to ensure that the conditioner and regenerator are most effective. Like in FIG. 8B, the tank 901 is kept at a temperature close to that of the conditioner.

Typically, the flow rate of the liquid desiccant necessary for effective dehumidification in the 3-way heat exchangers of the liquid desiccant systems of FIG. 1-3 is 5 to 20 times smaller than the flow rate of the heat transfer fluid when measured lbs./min. The maximum flow rate of the heat transfer fluid to air range from 1 to 1 and 2 to 1 in weight lbs./min, depending on conditions and efficiency targets required for the applications. In general, higher water flows improve system performance by reducing the temperature offset required between the water and air and between refrigerant and water. Higher desiccant flows improve the effectiveness of a liquid desiccant panel, but increases the size of the liquid desiccant heat exchanger and/or increases the heat losses, thereby reducing system level performance. At the current desiccant flow rates of 2-10 mm/reducing desiccant flows still improves overall system performance.

For systems with higher desiccant flows a dual tank system has significant benefits. A dual tank system as disclosed in U.S. Pat. No. 9,243,810, which is incorporated by reference herein. The dual tank system is appropriate when the application requires higher flowrates for example in an application using desiccants at low concentrations and high temperatures. Dual tanks also give additional flexibility in managing desiccant concentrations as will be discussed below.

Figure 10:
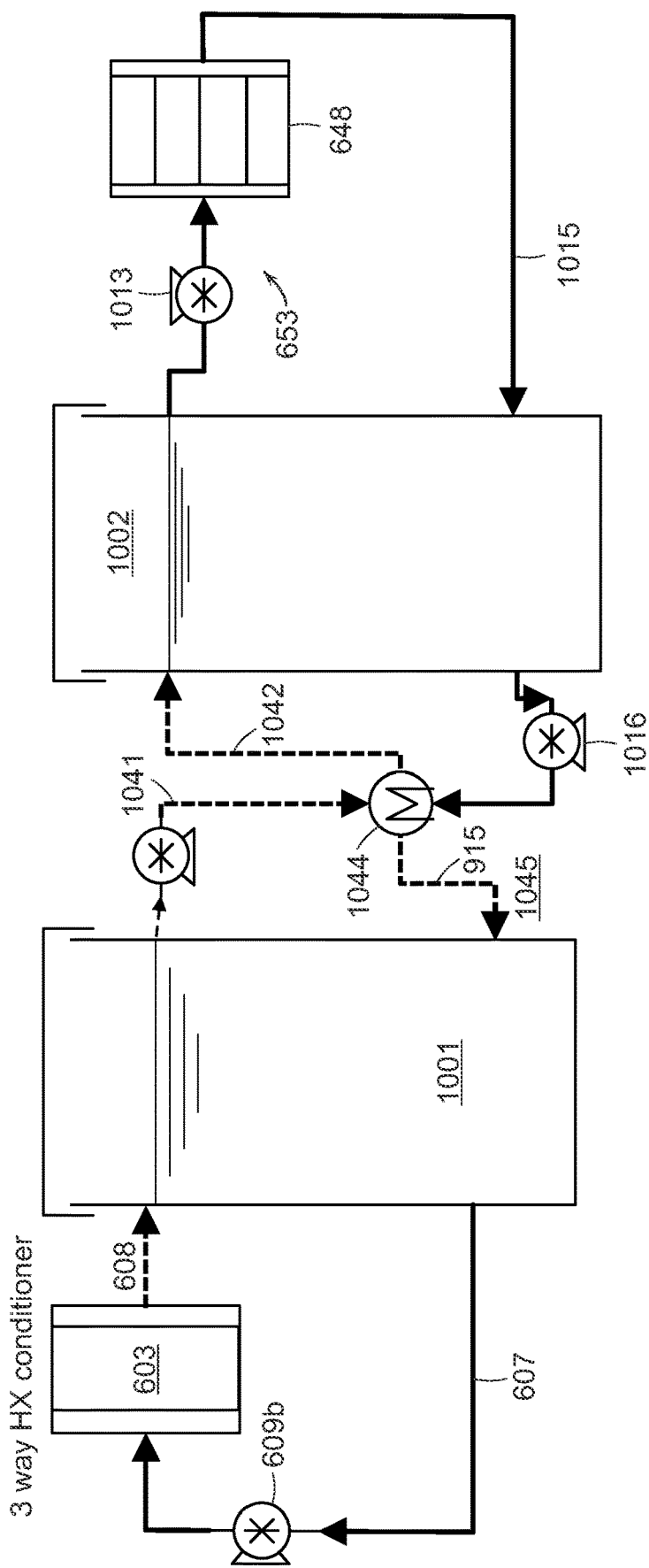
FIG. 10 illustrates an exemplary liquid desiccant air conditioning system in accordance with one or more embodiments, including a dual tank system with stratification and low volume transfer between the conditioner and regenerator tanks.

FIG. 10 shows such a dual tank system with separate pumps 1016 and 1041 to manage the liquid desiccant flows 1041 and 1042 between the tanks 1001 and 1002 through heat exchanger 1040. That is particularly important if the flows through the conditioner or the regenerator or both are high. By transferring only 10-20% of the liquid desiccant from the hot 1002 to the cold tank 1001, heat losses through heat exchanger 1044 are reduced by 80-90% to <5% of total work done.

The system in FIG. 10 is based on the configuration disclosed in U.S. Pat. No. 9,243,810. This embodiment does not use the overflow tank 732B from FIG. 7 to differentiate treated and untreated desiccant. Stratification can be used, e.g. by supplying diluted desiccant from the conditioner 603 to the top of tank 1001 with a similar floating supply point as shown in FIG. 5, which is then used to flow desiccant 1042 through pump 1041 to the heat exchanger 1044 and to the top of tank 1002. The same approach with a floating device can be used to take the diluted desiccant 1013 to regenerator 648 from which it returns as 1015 to the bottom of tank 1002. By reducing the flow through heat exchanger 1040, the heat loss from conditioner to regenerator is reduced in proportion with the ratio of total desiccant flow through the conditioner and the flow between regenerator and conditioner.

The dual tank system also allows the desiccant flow 607 through conditioner 603 and to tank 1001. Given the higher viscosity in the conditioner, its desiccant flow rate can be lower without losing coverage. If the heat source for regenerator 648 is a heat pump driven by the cooling load of 603, then using a two-tank system can further improve performance by using the heat available during hotter and dryer outside air conditions to deeply dehumidify the liquid desiccant in 1002 up to 40%+, while maintaining a steady concentration of the desiccant 607 from tank 1001 at 20-22% or any other concentration required for the application and conditions.

By increasing liquid desiccant flow rates 1013 through regenerator 648 a highly concentrated liquid desiccant is created in 1002. This can be used at a later time e.g. in the early mornings when cooling loads are low and the humidity of outside air is high to maintain the concentration of 1001 using pump 1016.

For non-compressor-based heat driven liquid desiccant systems this approach allows an operator of a liquid desiccant system as in FIG. 10 to shift loads from times with higher availability of local sun/wind/cogen power or lower power tariffs to times with higher tariffs or less availability of green power. Since renewables are shifting the timing of peak power from midday to early evening this becomes ever more important for utilities which can be reflected in system rebates or kW rates.

Other possible storage solutions will be discussed below. Concentrated liquid desiccant is a highly efficient energy storage device with greater cooling content per lb. than ice. It is particularly useful in dehumidifying Direct Outside Air Systems (DOAS), where the key requirement is to maintain Dew point/humidity conditions of fresh outside air, while leaving management of sensible loads to traditional systems, or sensible only solutions like chilled beams.

Stratification of the desiccant will ensure higher concentrated desiccant to be available for conditioning in 603 and low concentrations for regeneration in 648. However, some mixing of the desiccant in tank 1001 and 1002 will occur impacting the effectiveness of the regeneration and conditioning.

Figure 11:
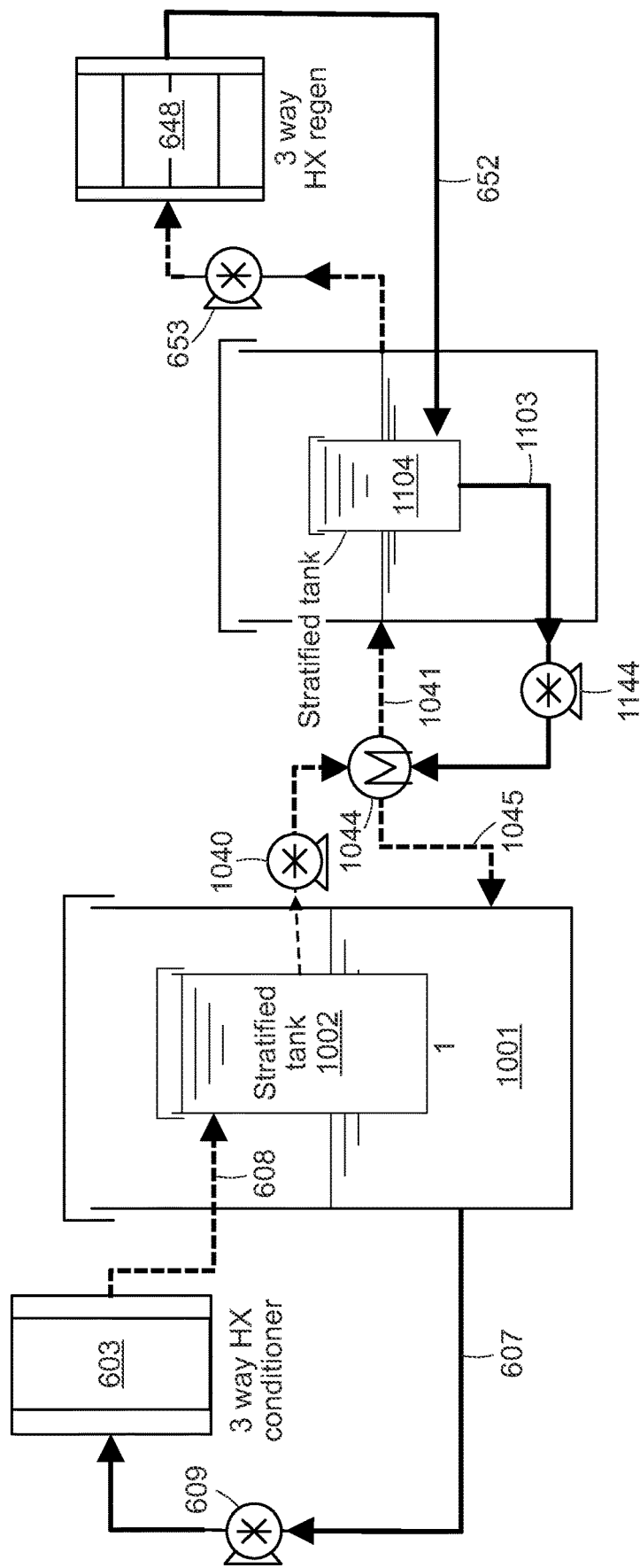
FIG. 11 illustrates an exemplary liquid desiccant air conditioning system in accordance with one or more embodiments, including a stratified dual tank system with low volume transfers between the conditioner and regenerator tanks.

The system disclosed in FIG. 11 further improves stratification by using sub-tank 1102 in the conditioner tank 1101. The sub-tank receives the diluted desiccant 608 from the conditioner. A small volume of that diluted liquid desiccant is supplied to the regenerator low concentrated desiccant tank 1103 via heat exchanger 1044. The low concentrated desiccant is processed by the regenerator 648 and returned to the stratified tank 1104. From the bottom of that tank the most concentrated desiccant 1144 is transferred through the heat exchanger 1044 to the conditioner tank 1101 with cool highly concentrated desiccant. This maximizes effectiveness of the regeneration process but at a significant cost in complexity. Whether that tradeoff is worthwhile depends on the volume of desiccant used and the change in concentration in each step.

The difference in concentration for the conditioner and the regenerator can be further increased by using a floater in tank 1103 to supply the lightest and most diluted liquid desiccant from the top of that stratified tank 1103. The concentrated liquid desiccant from the regenerator is stratified in tank 1101 where the most concentrated liquid desiccant is taken from the bottom of the overflow tank and send to the conditioner The sub-tanks 1102 and 1104 are designed to overflow. For example, if pump 1140 is stopped, sub-tank 1102 will overflow and mix with the desiccant in the main tank 1101. That will reduce the concentration of 1112 and thus increase the RH of supply air. Similarly, 1104 will overflow when pump 1144 is stopped. When the desiccant is significantly diluted the level in tanks 1101 and 1103 might rise sufficiently to rise above the maximum level of tanks 1102 and 1104 which will then fill up.

The proposed multi tank approach is particularly important for systems using high liquid desiccant flows. In the system of FIG. 6, for each lb./min of air ⅒ or less of desiccant should be used for optimized performance. When the desiccant volumes are +/−50% of the air volume per minute using a dual tank, system is essential.

To optimize performance, the lowest concentration and hottest desiccant should be used for the regenerator, the coldest and highest concentration in the conditioner and the total volume of desiccant through the heat exchanger should be minimized. To maximize the difference in concentration supplied to the conditioner and regenerator stratification and/or compartmentalization of the tank may be required.

Figure 12A:
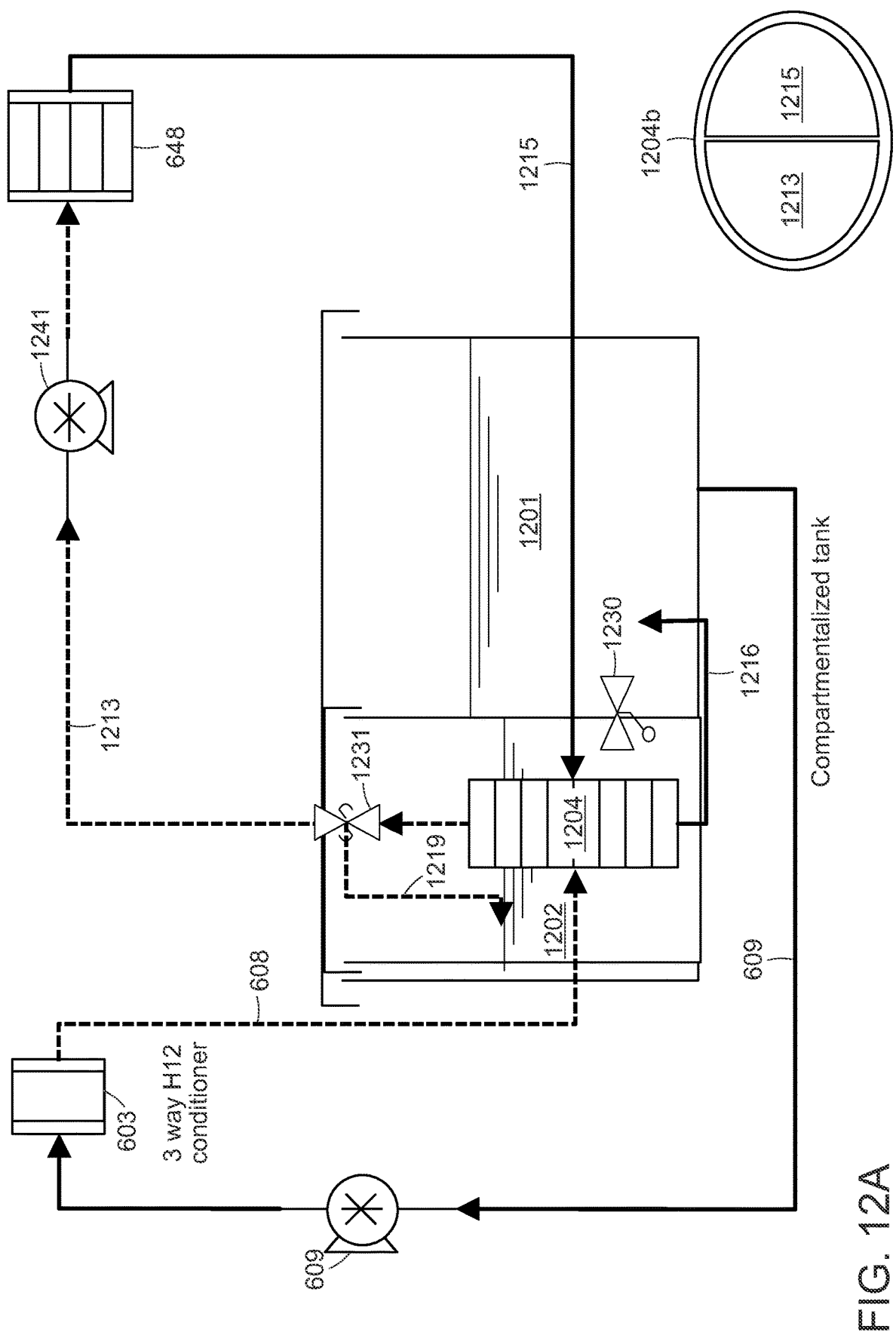
FIGS. 12A and 12B illustrates exemplary liquid desiccant air conditioning systems in accordance with one or more embodiments, including an integrated tank system with a direct flow option between conditioner and regenerator with cool liquid desiccant in the tank and with an integrated heat exchanger.
Figure 12B:
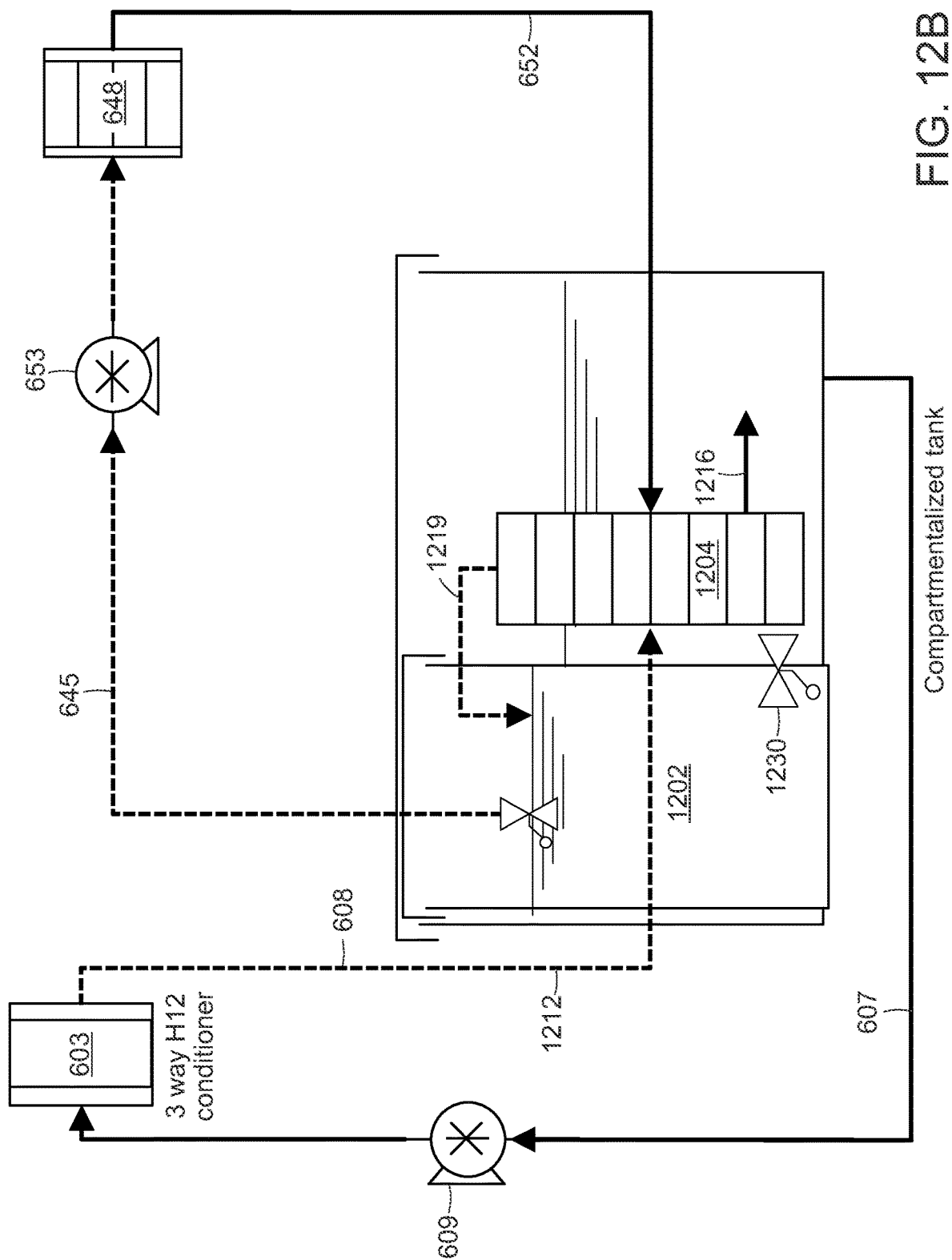

FIG. 12A shows a compartmentalized system with low concentrations in sub-tank 1202 and high concentrations in the main tank 1201. Valve 1230 can be used to ensure that sub-tank 1202 does not empty out when the conditioner does not operate. Liquid desiccant 1202 returning from conditioner 1211 goes through heat exchanger 1204, which can be located in sub-tank 1202 or main tank 1201 (FIG. 12B). Locating tank 1204 inside the tank 1201 can simplify maintenance by reducing the complexity of draining of the system for panel replacement. Also, any small leaks in 1204 will not impact system integrity or performance. FIG. 12B shows the heat exchanger 1204 on the regenerator side. That requires lines 1213 and 1215 to be insulated or kept outside the conditioned space to minimize heat losses.

U.S. Pat. No. 9,243,810 shows that heat exchanger 1204 can take a variety of forms, including a plate heat exchanger as well as insulated tubing for 1212/1209 and 1213/1215 as shown in FIG. 12A in 1204B From there the diluted desiccant 1213 is pumped by 1241 to regenerator 648. The regenerated, concentrated desiccant 1215 returns via heat exchanger 1204 and from there via 1216 to the bottom of tank 1201. Positioning exchanger 1204 in low concentration sub-tank 1202 ensures that in case of leakage of 1204 the leak is contained. An insulated heat exchanger positioned above the desiccant in the tank has no thermodynamic effects but does have potential maintenance and reliability advantages.

Overflow 1231 will return desiccant 1219 from the heat exchanger 1204 to the diluted tank when the regenerator isn't used. When the conditioner is not used, regeneration can continue by using either device 1231 or a parallel valve to draw desiccant 1219 from the tank rather than from 1204. Various solutions exist for combining a two-way valve with an overflow/flow limiter.

One-way valve 1230 is used when fluid levels in sub-tank 1202 fall too low so that desiccant from the main tank need to be added. For example, pump 1210 is turned off during periods in which no latent cooling is required. Continued regeneration can the still continue to provide a store of highly concentrated liquid desiccant for later use. This is particularly important in situations where sensible loads are high and latent loads low in the middle of the day, while latent loads maybe increase sharply in the evening, for example in coastal regions.

When levels are too high, sub-tank 1202 can overflow in the main tank 1201. This can be done by lowering the wall between the too, which can also be useful at very low concentrations and high volumes of liquid desiccant to make full use of the available tank volume to reach the lowest concentration that may be required.

One skilled in the art would understand that various configurations are feasible, including positioning the heat exchanger 1204 in the main tank to pre-cool the warm liquid desiccant to be send by pump 609 to Conditioner 603.

The concentration of the liquid desiccant will change with changes in supply and target conditions and the settings in the system. Concentrations can change from 15 to over 40%. As a result, the system needs to be able to store additional volumes of liquid desiccant. The tank or tanks need to be able to manage the most or all of the desiccant in the system depending on the startup and maintenance protocols.

Figure 13A:
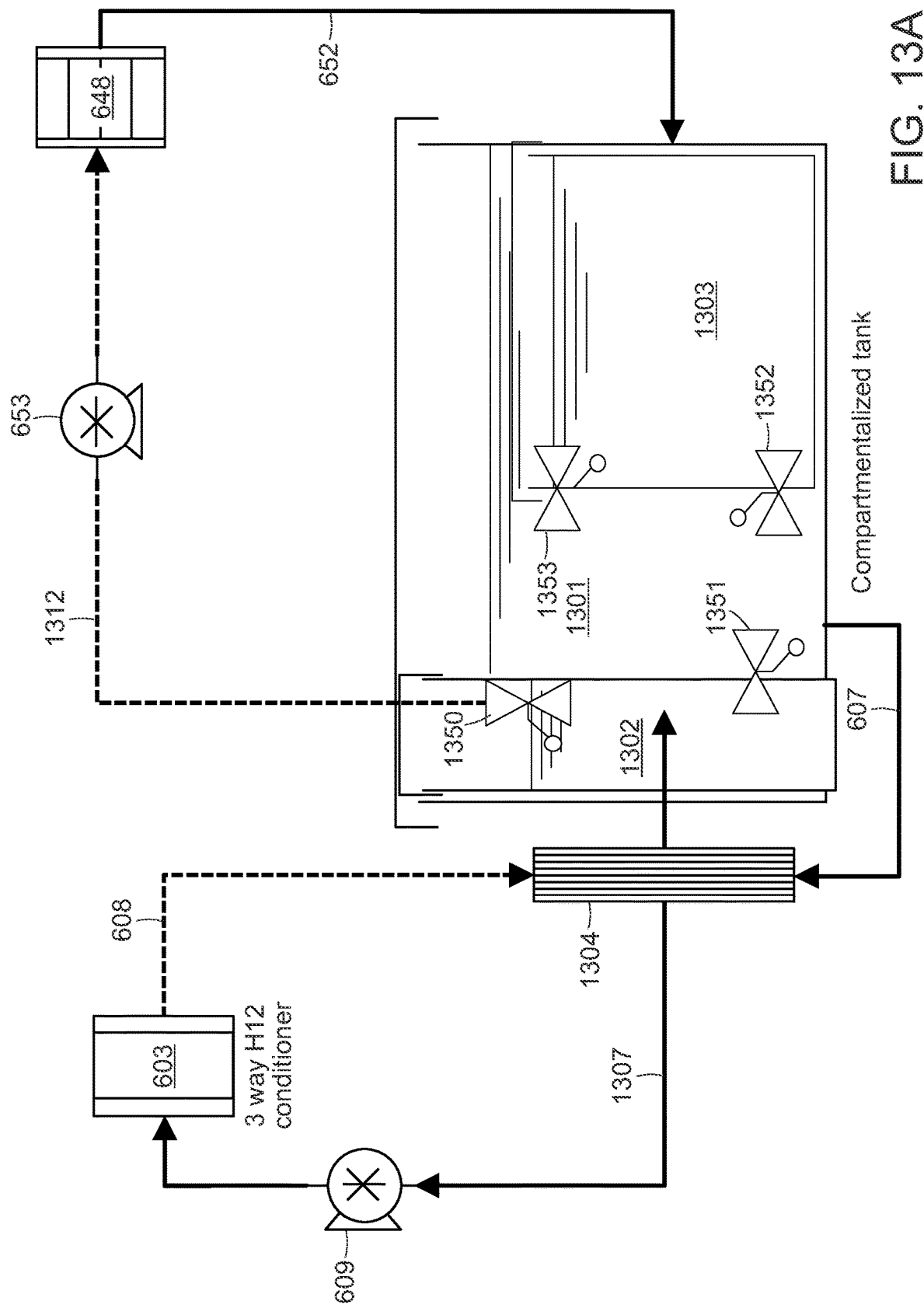
FIG. 13A illustrates an exemplary liquid desiccant air conditioning system in accordance with one or more embodiments, including a multipart tank with an external heat exchanger.

As shown in FIG. 13A, to further minimize the liquid desiccant volume used in the system, part of the highly concentrated desiccant can be separated out in a small high concentration tank 1303, which is connected via valves 1352/1353 to the main tank 1302. Valves 1352 opens when the concentration in the main tank 1302 falls below the level of the valve and close when the level rises above it. 1353 ensures that the tank 1303 is filled up with high concentrated liquid desiccant. Various types of valves can be used, e.g. through floater activated valves. The precise system is not critical for the key role of 1303, which is to allow 1301 to dilute desiccant starting from a smaller volume and thus requiring less space. The main tank supplies high concentrated desiccant 1310 to the conditioner and receives highly concentrated desiccant from the regenerator 1311. The sub-tank 1301 with the low concentration desiccant (in cooling mode) provides low concentrated desiccant to the regenerator 648 and receives low concentrated desiccant from the conditioner 603. As shown above the heat exchanger 1304 can be between the conditioner and the tank where concentrated liquid desiccant 1307 from tank 1301 is supplied to the conditioner 603 via heat exchanger 1304. The diluted liquid desiccant 608 is first warmed up in 1304 before it returns to tank 1302. This keeps the tank at a temperature close to ambient or outside conditions, i.e. it is most appropriate when the tank is not in the conditioned space. The heat exchanger can again be integrated in the tank, or it can be separate.

The integrated triple tank solution minimizes the size of the main tank, allows for a broad range of concentrations and thus supply conditions. It also reduces response times of the system as the total volume of liquid desiccant is further reduced.

Figure 13B:
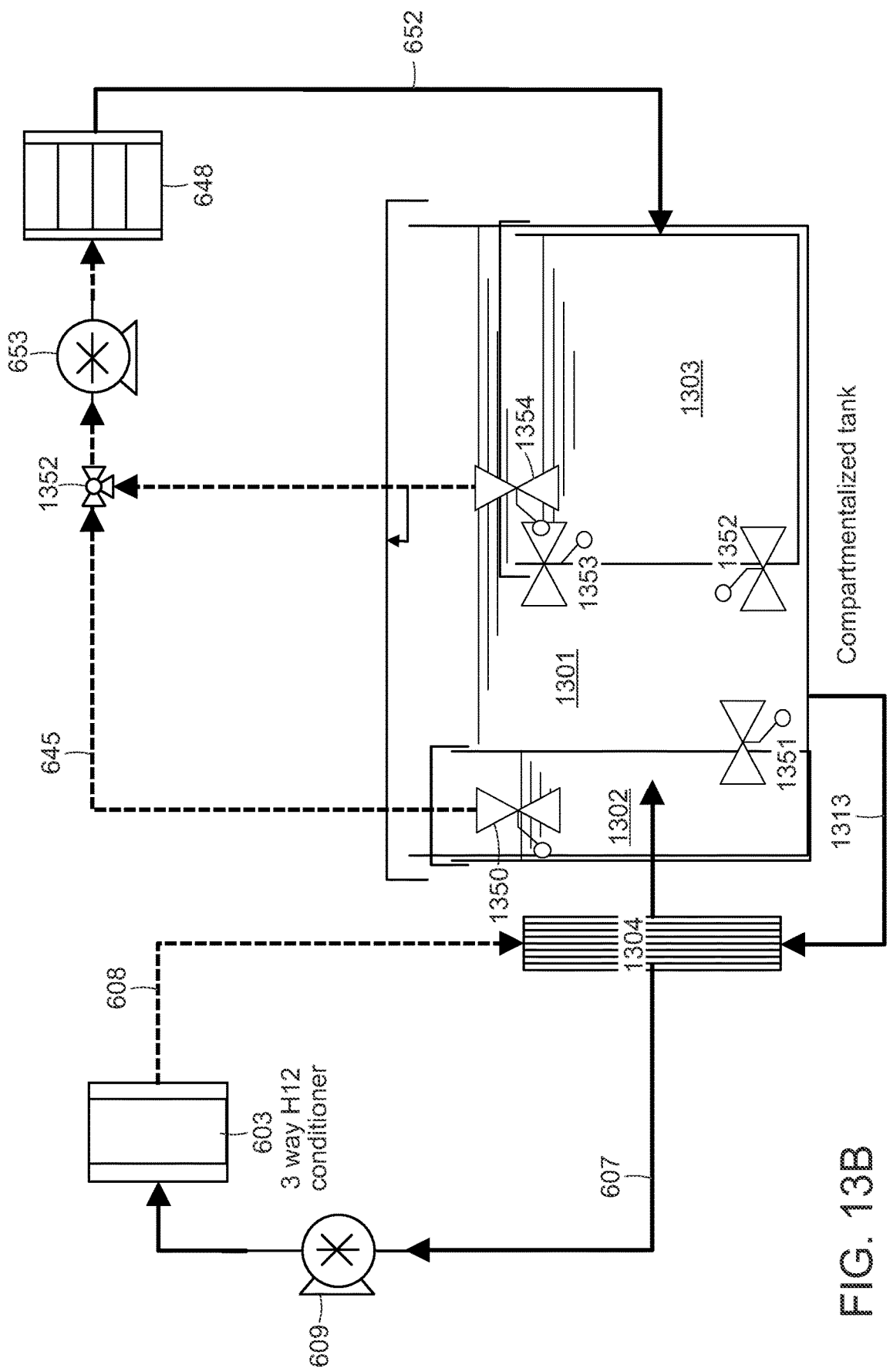
FIG. 13B illustrates an exemplary liquid desiccant air conditioning system in accordance with one or more embodiments, including a multipart tank solution with multiple valves and an integrated heat exchanger.

A similar multi compartment tank system can be used for storing highly concentrated liquid desiccant. In FIG. 13B, the valves 1350 and 1351 can be actively controlled to adjust the concentration in 1301 to meet specific requirements for relative humidity in the conditioned space. Valve 1351, 1352, and 1353 can be used to maintain balance in the system, or an overflow system can be used for that purpose. This can be useful in advanced solutions where occupation of a space and thus latent loads change significantly over time. Lower concentrations and more humid conditions may require less cooling during low occupation. Using 1354 as a source for regenerator increases the concentration in 1303 allows for deeper dehumidification during high occupation of the space.

Figure 13C:
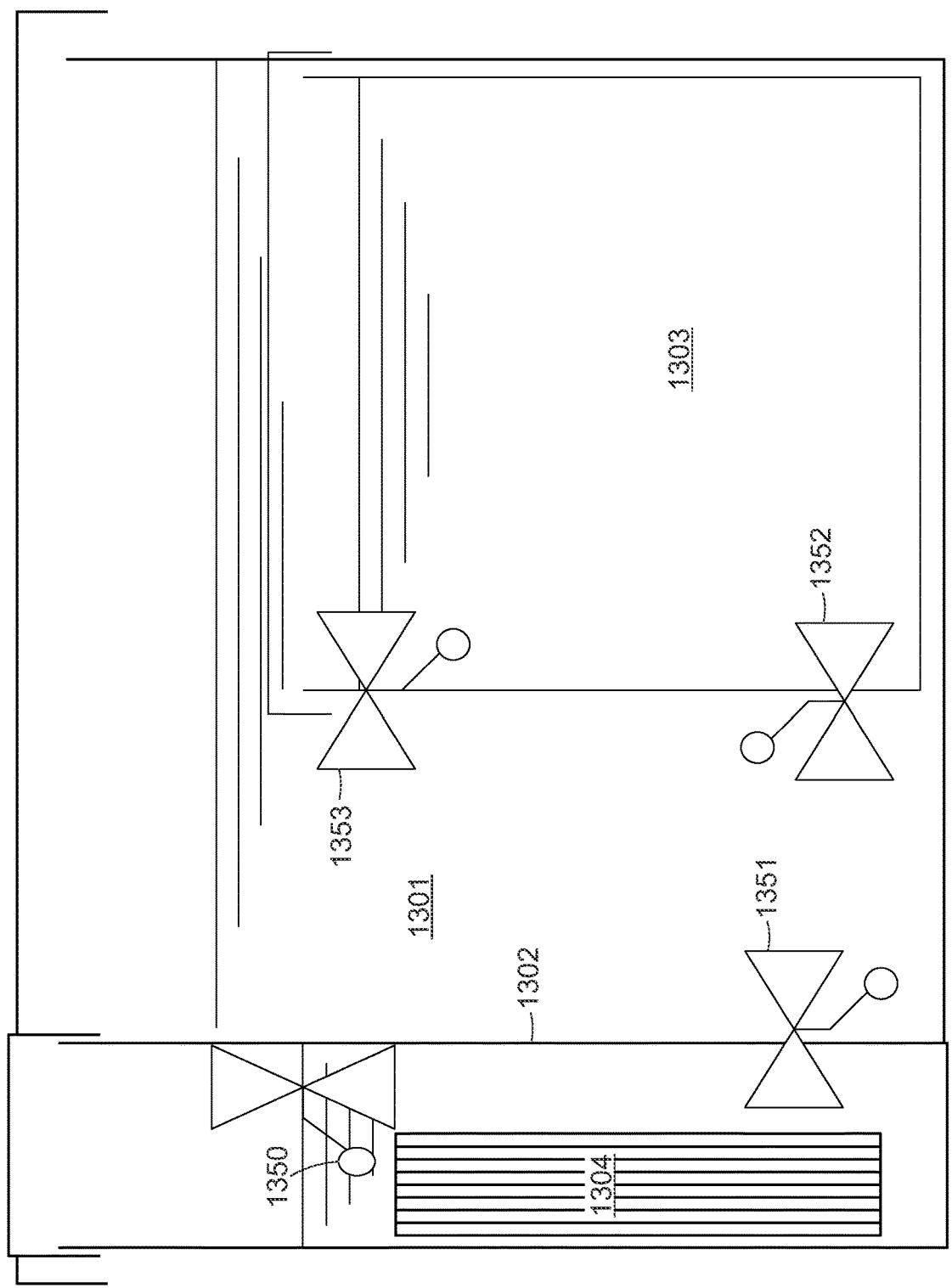
FIG. 13C illustrates an exemplary three-way tank with an integrated heat exchanger in accordance with one or more embodiments.

FIG. 13C is similar to 13A but now with the liquid desiccant heat exchanger 1304 integrated in the tan 1302. Valves 1350, 1351, 1352, and 1353 are used to regulate the levels in each of the tanks 1301, 1302, and 1303. These can be passive systems like floater-based solutions or active valve systems directly controlled by the unit control system for greater fine tuning of the system.

Figure 14:
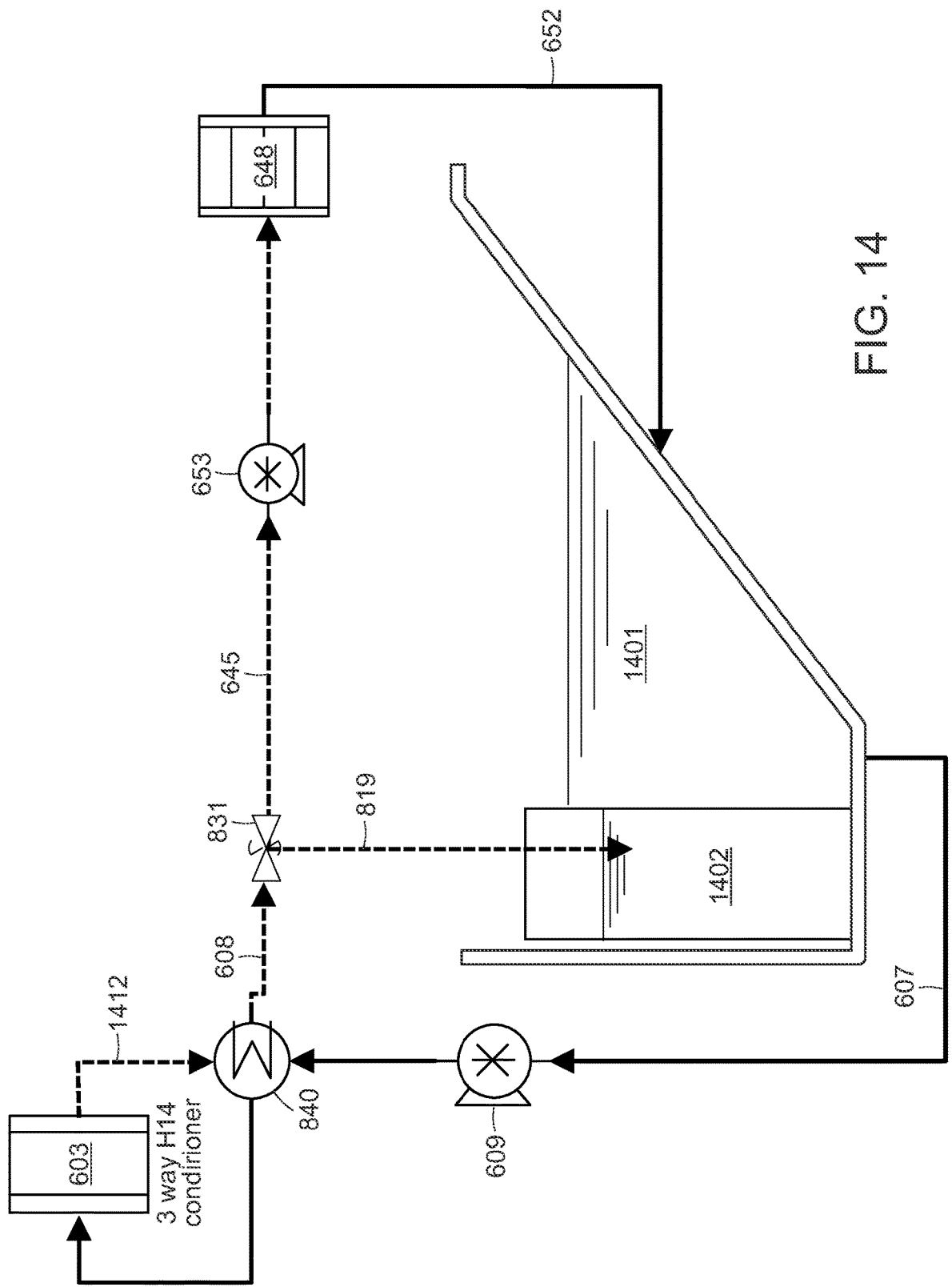
FIG. 14 illustrates an exemplary tank having a slanted side to provide a more linear relation between concentration and level in accordance with one or more embodiments.

FIG. 14 shows a similar solution but now with a tank 1401 with a slanted bottom 1401 to maximize the height of the small volumes of the most concentrated desiccant in the tank and to ensure that tank levels and concentrations have a more linear relationship. FIG. 14 also shows a sub-tank 1402 for the overflow diluted liquid desiccant. Again, various modes are possible, depending on cost and performance tradeoffs.

It would be understood by those skilled in the art that other shapes, valve systems and compartments can be used to minimize the size, maximize concentration control and minimize cost of valves and the tank system. More complex systems may also be useful for storage of highly concentrated desiccant. As discussed above this s a form of energy storage.

Figure 15:
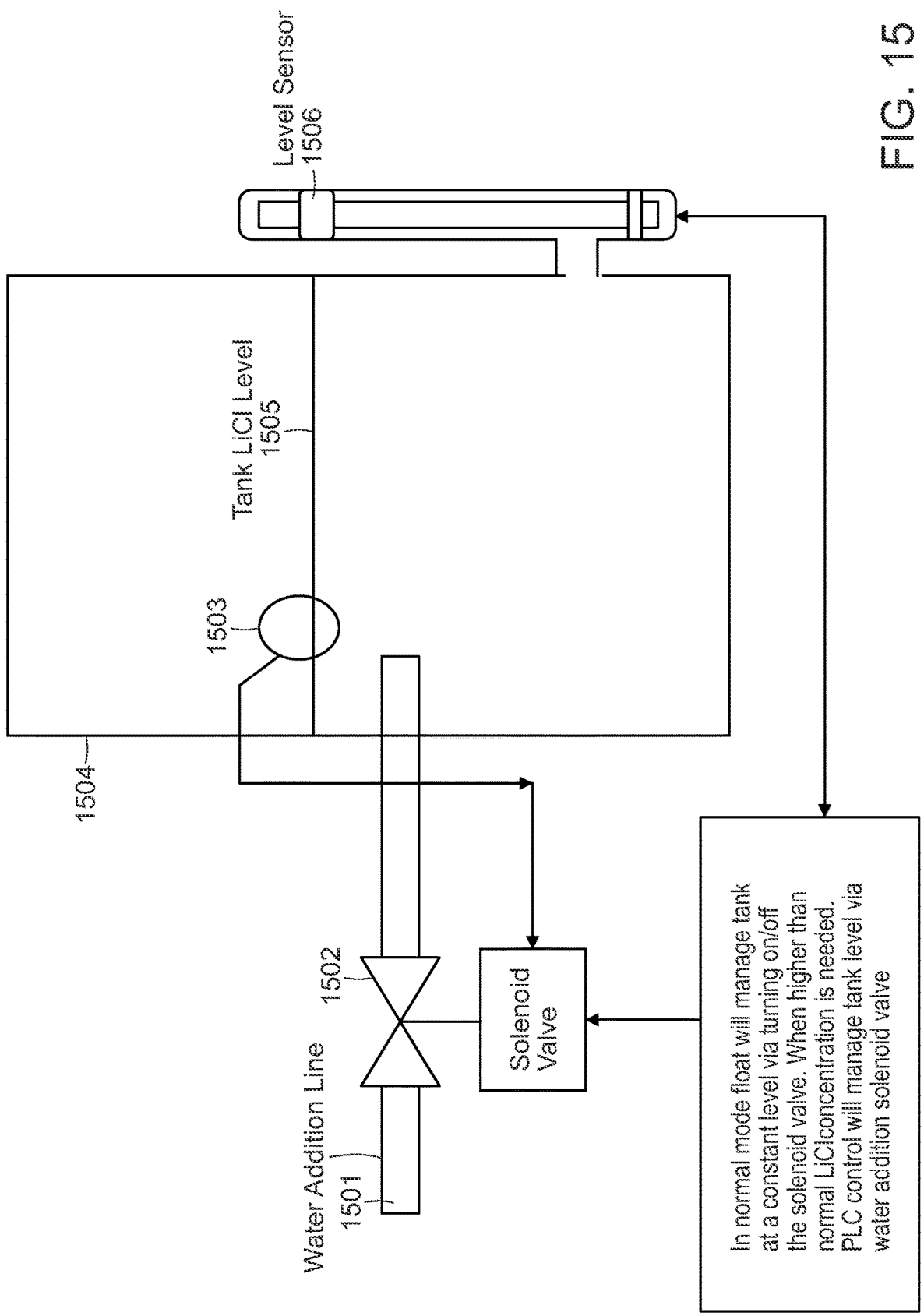
FIG. 15 shows an exemplary water addition control system for a liquid desiccant air conditioning system in accordance with one or more embodiments.

FIG. 15 shows a simple mechanism for water addition using demineralized water 1501 that is supplied through solenoid valve 1502 which is driven by floater 1503 in tank 1504. Tank level 1505 can be measured by level sensor 1506 which can be used to control the solenoid valve rather through a control program that can then vary desiccant concentrations depending on the input conditions, supply conditions and outside air.

Figure 16:
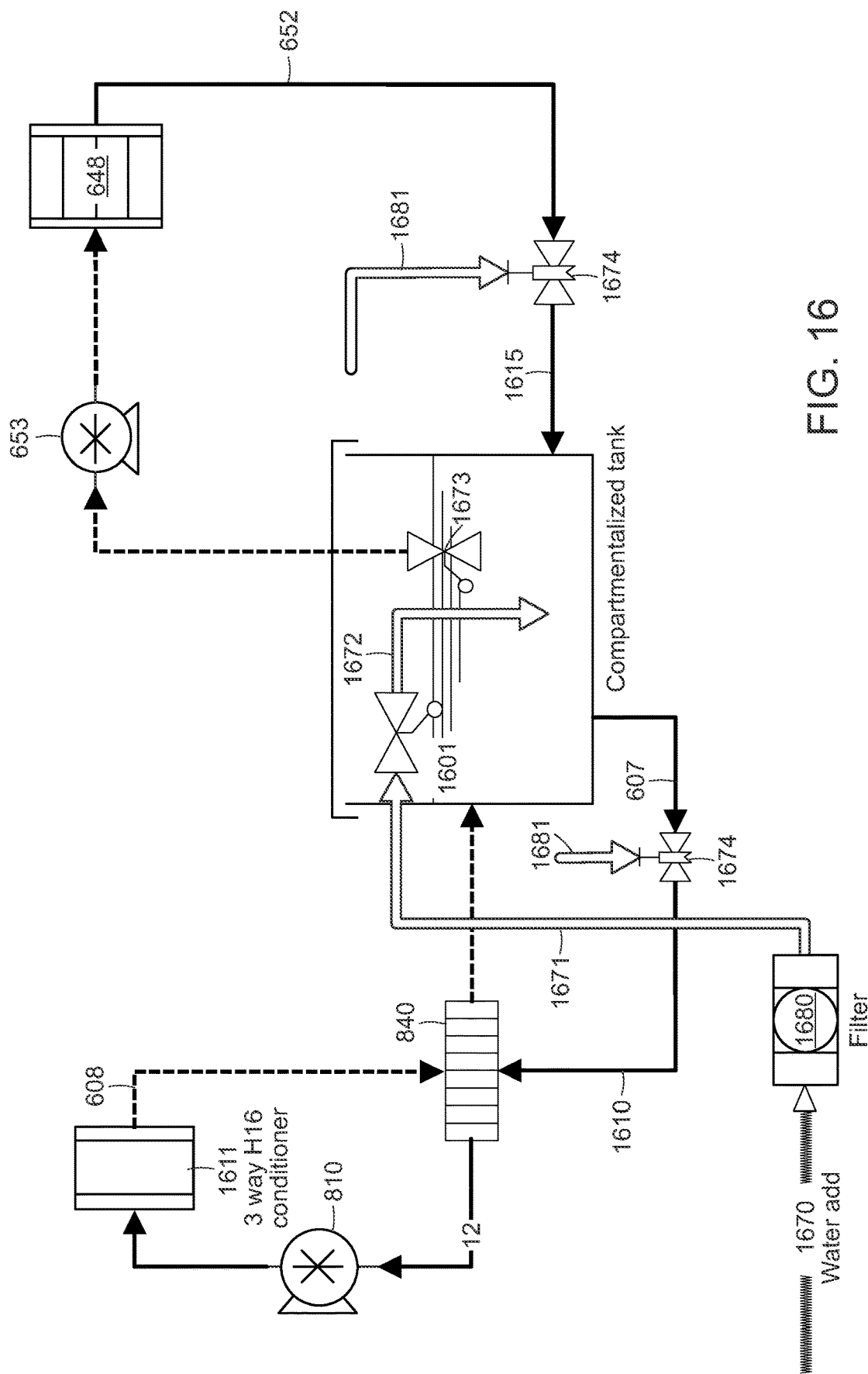
FIG. 16 illustrates an exemplary liquid desiccant air conditioning system in accordance with one or more embodiments, including water addition apparatus.
Figure 17:
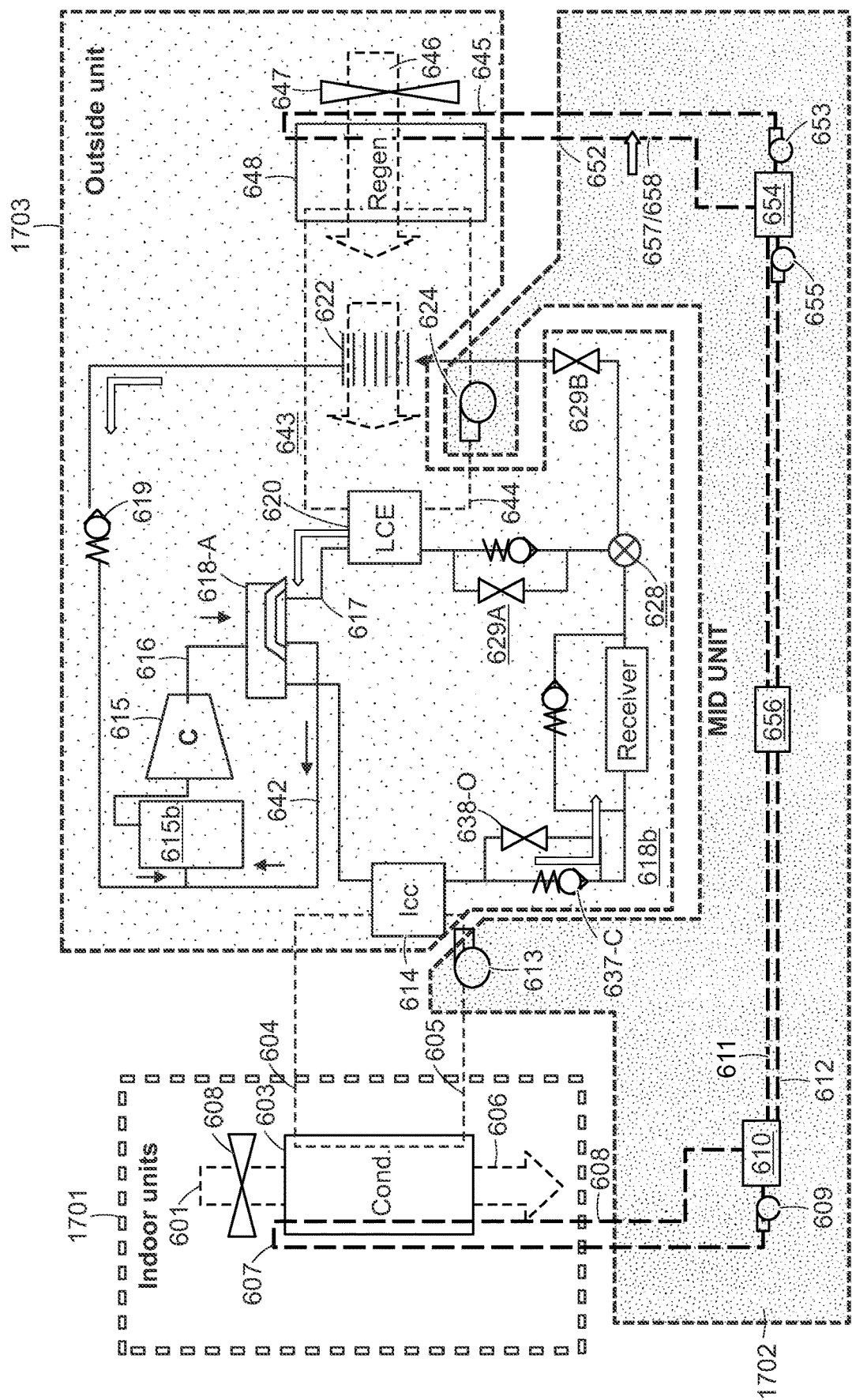
FIG. 17 illustrates an exemplary split-system liquid desiccant air conditioning system in accordance with one or more embodiments, including multiple tanks in a heating mode.

FIG. 16 shows the direct supply 1670 of filtered 1680 and demineralized water 1671 to the tank 1601. 1672 can then be used to directly dilute the liquid desiccant. The filtering can be a forward or reverse osmosis process or other treatment that creates mineral free water. Direct supply to the tank is a simple and well understood solutions. However, avoiding scaling of the liquid desiccant panels in conditioner 1611 and regenerator 1614 requires a high degree of demineralization of high-quality potable water. Vapor transition modules 1674 is another alternative for dilution of the desiccant. They allow the use of seawater and other forms of non-potable water to be used as feed 1681. Their transfer rate is temperature dependent, therefore they tend to be located in the regeneration loop where the hot and concentrated liquid desiccant 652 from 648 is diluted to 1615. When the sizing of the vapor transition unit is less of a concern it can be used in the conditioner loop to dilute the concentrated liquid desiccant to 1610. This is also appropriate in heat pump solutions where heating and humidification is the primary application. The intensity of water use by the system as well as scarcity of potable water will influence that choice. For example, if the unit is used in highly humid climates, where water addition is rarely used only to protect the unit, a cheaper direct addition to the tank solution may be more possible especially if concerns about mineral transfer into the desiccant system are limited FIG. 17 discloses a multi split system with potentially multiple indoor units 1701 at different floors in a building. In this case multiple desiccant tanks 610 may be used to optimize pressure and flow control. A multi-tank system including a separate regenerator tank can be included. This flexibility is critical in multistory multi-space solutions. The desiccant tanks, water addition modules, the heat exchanger as well as the pump could all be positioned in a separate "mid Unit" 1702 in a space inside the building with a water supply and water sink. In this case the outside unit 1703 is very similar in size and weight to traditional units, comprising only of the fans, compressor and regenerator panels. Especially for residential units downsizing the outside unit and ensuring easy excess to water is a key consideration in the success of such a solution.

Figure 18:
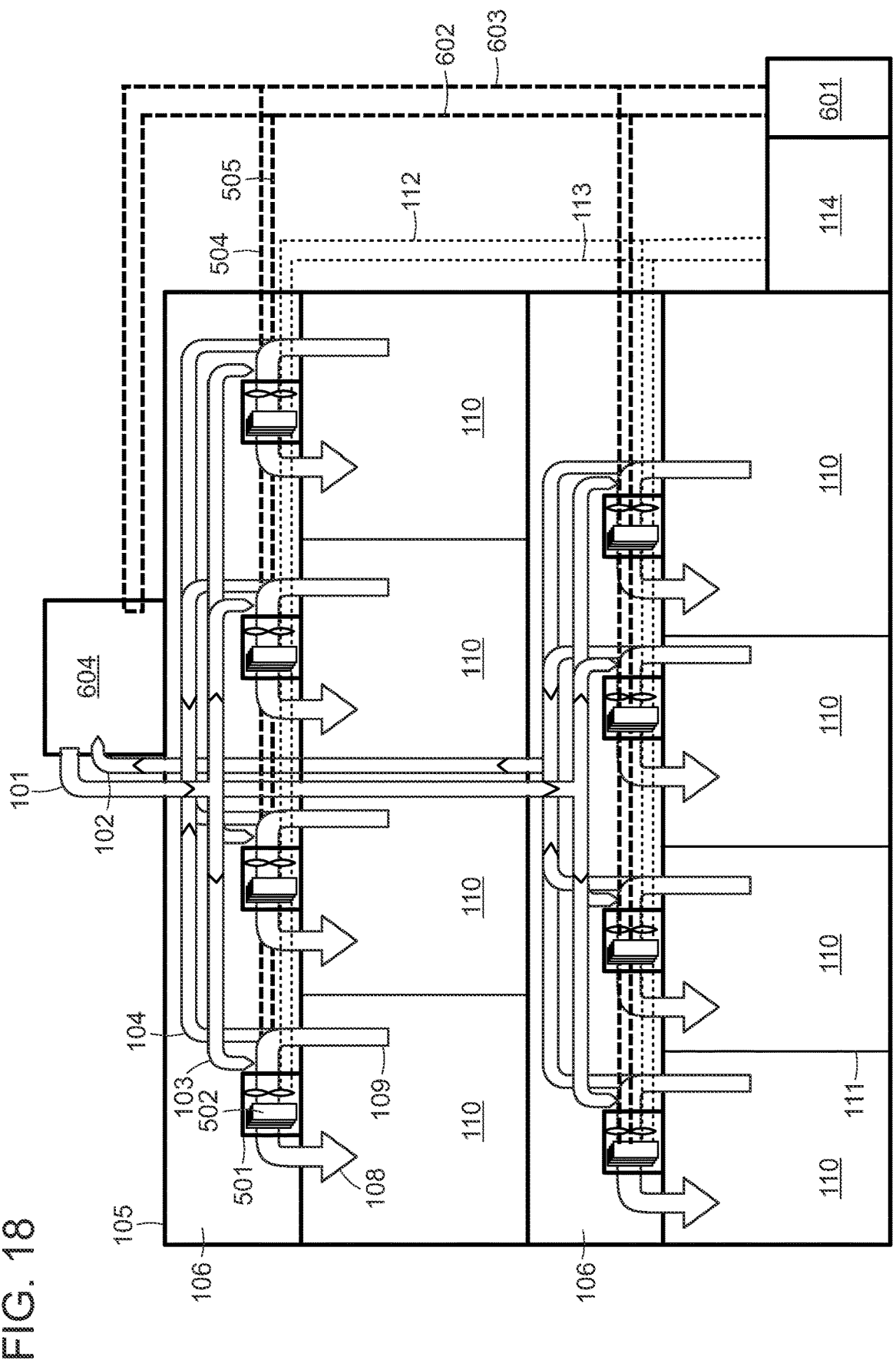
FIG. 18 shows a multi-zone building with multiple ceiling units, DOAS units and separate regeneration.

FIG. 18 is a figure from U.S. Pat. No. 9,470,426, which shows a liquid desiccant system for building 105 with multiple conditioners 502 and a single regenerator 601. Some of these are ceiling units for the spaces 110, using recirculated air. Others can be a DOAS unit 604, which uses a mix of outside air and exhaust air 102 to condition air 101. A separate regenerator unit 601 shown next to a large chiller 114 provides effective cooling for the chiller's condenser and uses that to reconcentrate the liquid desiccant from the ceiling units and the DOAS unit 604. Internal spaces 106 are used to position the desiccant systems 501 including the conditioners 50. The units condition return air 109 and outside air 103 processed by DOAS unit 604 to supply air 108 to the space. To do this requires desiccant 504 and 505 from and to the central regenerating unit, via 602 and 603 which incorporate the requirements of the DOAS. And cold water from the chiller 114 supplied via piping 112 and 113.

This system is best suited for spaces with similar requirements for each of the spaces 110. But variation does occur, at the very least because of occupation and location as well as use. Some of these zones may use only outside air, e.g., operating rooms in hospitals, some may have significant exhaust air (e.g., sports facilities that can be used for regeneration and others may have large humidity loads, but lower fresh air requirements, e.g., swimming pools. Each of those spaces could therefore require a different SHR.

This is particularly important for some applications like grocery stores. A grocery store typically has a wet section for fruits and vegetables, which is kept warm and moist. Most of the building requires a lower temperature and dry bulb, e.g., to maximize product life and customer comfort. The cold sections with refrigerated goods often require lower temperatures and low humidity levels to avoid frosting of the cabinets. Liquid desiccant systems are able to meet such a variety of requirement in a building with one chiller system using a variety of tools.

Figure 19:
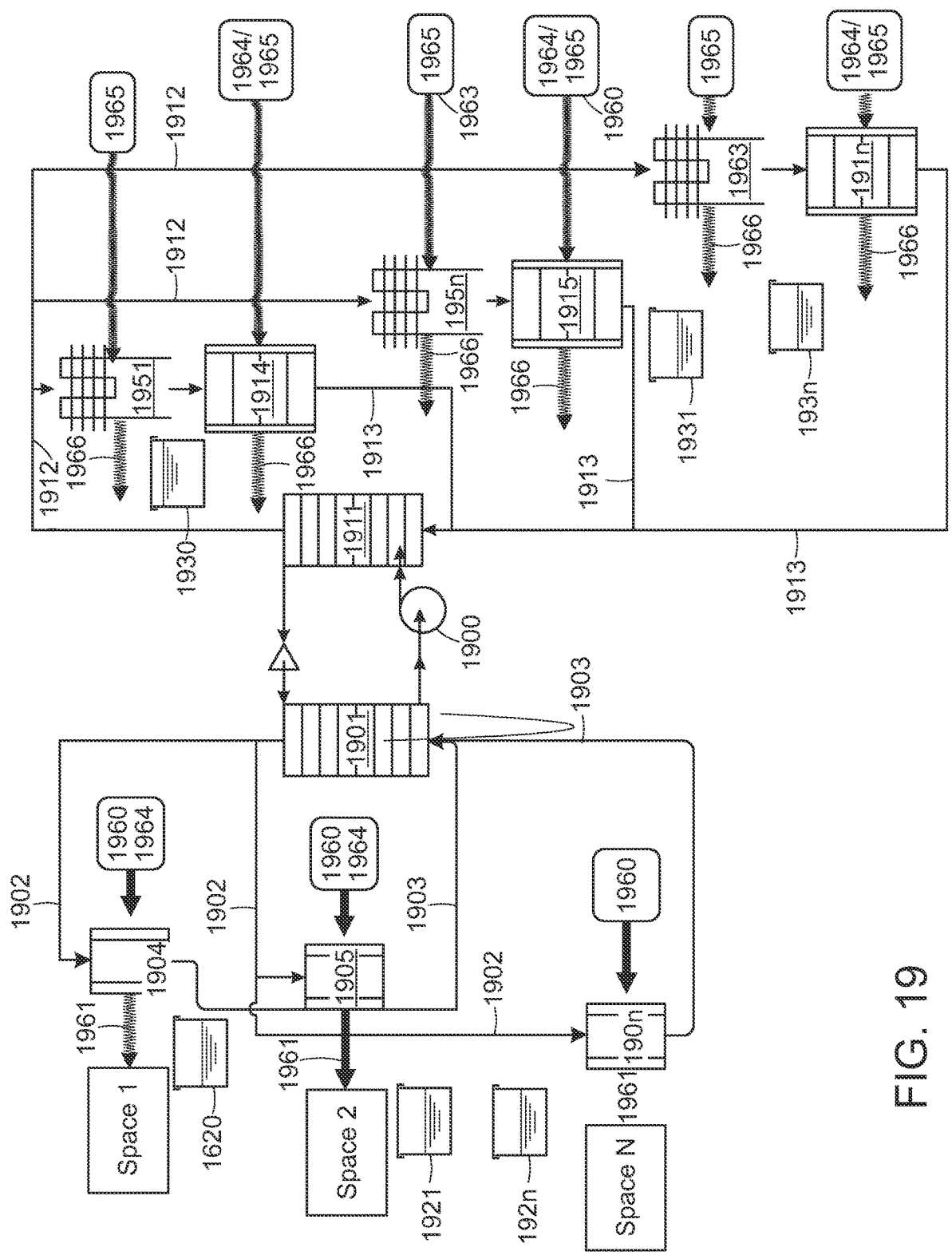
FIG. 19 illustrates an exemplary liquid desiccant air conditioning system in accordance with one or more embodiments, including a multi-tank solution in a multi zone building with differentiated requirements.

FIG. 19 shows how a chiller system 1900 that uses evaporator 1901 to supply cold water 1902 to multiple conditioners (1904, 1905 to 190$n$), returning warmer water 1903. The condenser 1911 provides hot water 1912 to multiple regenerators (1914, 1915 and 191$n$) returning cooled down water 1913. Each of the conditioners can service one of the zones of a building. If the supply conditions 1961 required for space 1931, 1932 and 1933 are different, then the desiccant for these spaces should have different concentrations. Each conditioner or a group of conditioners could therefore have its own tank 1920, 1921 and 192$n$ with a different concentration of liquid desiccant depending on the required supply conditions 1961. The volume of liquid desiccant is determined by the volume of air to be processed 1960 which can be a mixture of outside air 1960 and return air 1964. To maintain that requires that regeneration that supply highly concentrated liquid desiccant from tanks 1930, 1931 and 193$n$ each with its own concentration, related to the availability of outside air OA 1965 and exhaust air EA (1964) that maintain that concentration.

When a low concentration of liquid desiccant is required to maintain a relatively humid condition, e.g., in a green house or vegetable section of a super market, then regeneration with high flows of outside air 1963 might cause maximum sensible cooling. If even more dilution is needed, e.g., because the outside conditions are already quite dry, then further dilution of the desiccant can be achieved by flowing additional outside air 1965 over sensible coil 1951, 19522 and 195$n$. Or direct water addition is an option using a vapor transfer membrane unit.

When high concentrations of liquid desiccant are required, no air can be used for the sensible coils 1951-195$n$. At the design stage the coil can even be eliminated for this regenerator sub unit. Low air flow over the regenerator will reduce the sensible effectiveness of the panels and can increase the latent regeneration.

Even higher concentrations can be achieved using dry exhaust air from the building. Since exhaust air is not available everywhere, the regenerator can be placed close to the exhaust location, with just the desiccant being transferred to the appropriate tank.

Multiple desiccant and water tanks can be used in complex buildings for the purpose of managing pressure drop and desiccant and water flows with greater effectiveness.

A combination of sensible coils and/or direct water dilution can be used to change the concentration of desiccant. FIG. 19 shows such a configuration. Regenerators 1914, 1915 till 191$n$ are all fed by a single condenser coil 1911. However, the concentration of the desiccant coming out of the regenerator can still be varied. First by an air-cooled coil 1951 through 195$n$ in series or in parallel with the regenerators 1914, 1915 etc. (in series is shown) on the water circuit. When the sensible coils 1951, 1952 through 195$n$ are in parallel, heat can be diverted from the regenerator by increasing shifting flow from the regenerator to the air-cooled coils. This will reduce the concentration. When they are in series, the concentration can be changed by flowing more or less air through the regenerators and the air-cooled coils.

Figure 20:
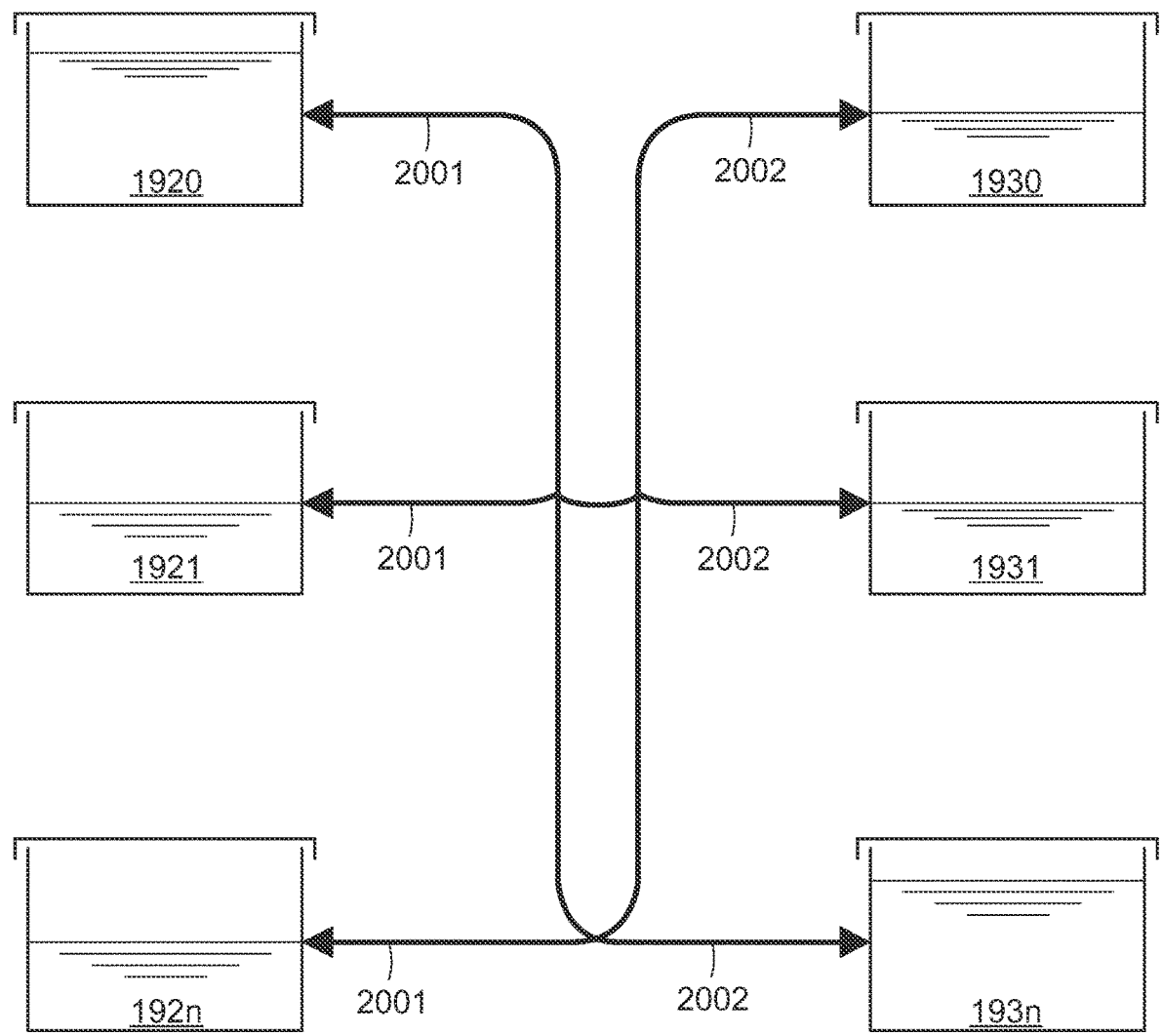
FIG. 20 shows an exemplary multi-tank system for optimization of liquid desiccant concentration in accordance with one or more embodiments.

FIG. 20 shows how the tanks can be connected in a variety of ways to match the expected loads using pumps similar to the mechanism shown in FIGS. 10 and 11. Concentrated liquid desiccant 2001 flows from regen tank 1930, 1931 till 193n to conditioner tanks 1920, 1921 and 192n. Diluted liquid desiccant 2002 is send from the conditioner to the regenerator. By using a system of valves rather than fixed connections, dynamic control is possible. Since desiccant concentration directly drives supply air RH, multiple tanks also improve system response times by allowing several available concentrations of the desiccant to be kept allowing for switching between tanks when required to meet changing conditions.

Each space has its own liquid desiccant circuit and can circulate desiccant through the panels 1904, through 190n and back to tank 2101 via heat exchanger 2102. An adjustable valve 2103 allows some or all of the desiccant from the tank to be mixed in. A second adjustable valve 2104 allows part of the diluted desiccant to be returned to the tank. By controlling the circulation rates with pumps 2105 and the mix rates with valves 2104 and 2103, desiccant concentrations can be varied from space to space. Since concentration directly drives the RH provided to the space, we can vary RH by the mixing ratio. Using a similar arrangement on the water/heat transfer fluid side we have independent control of temperature and humidity provided to the space.

Figure 21:
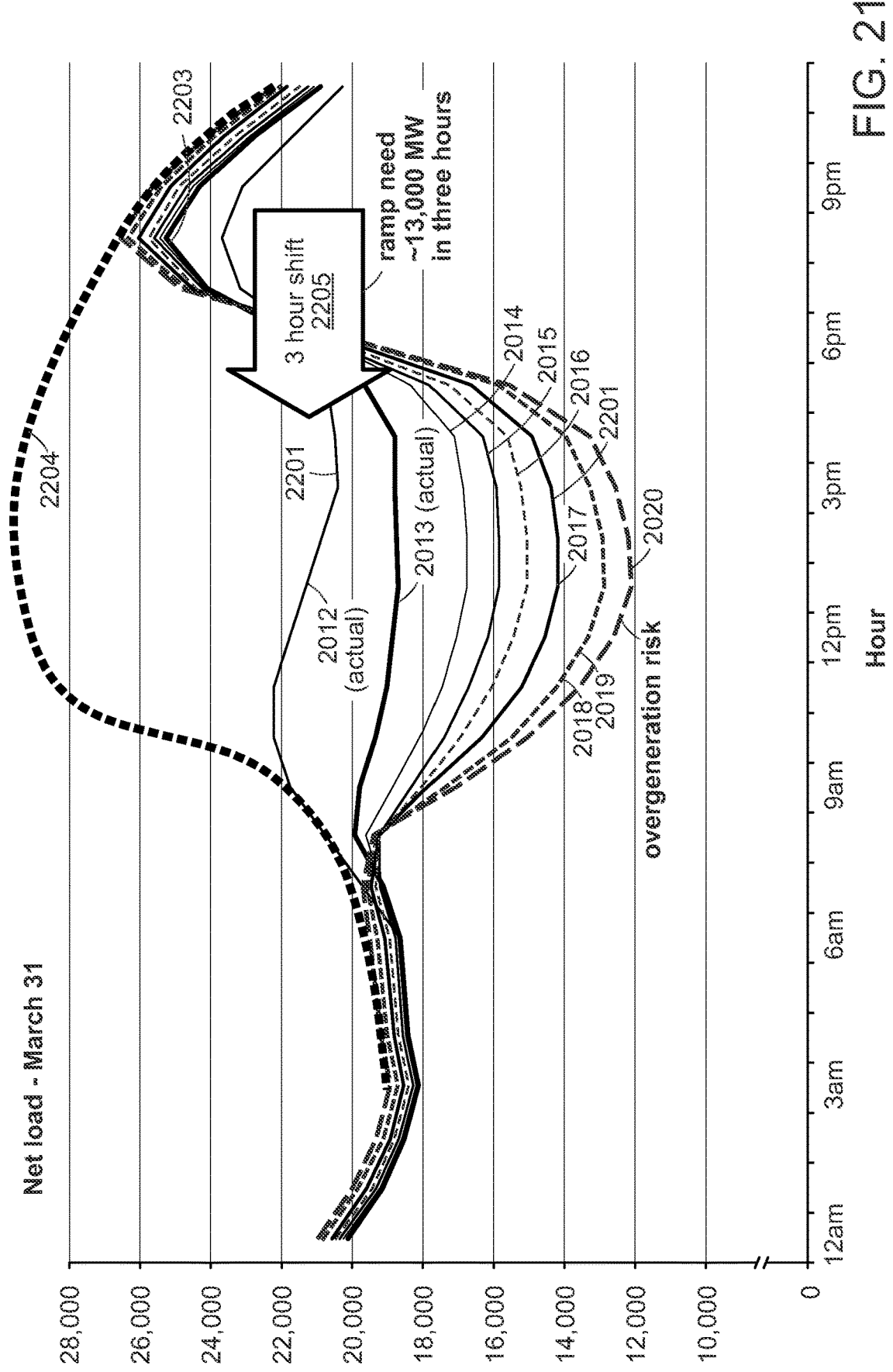
FIG. 21 illustrates a California duck curve graph of power production over the course of a day.

FIG. 21 shows a duck curve in California in different years between 2012 and 2020. In the past, loads for the network would peak at 12 pm (2204). In 2012 the peaks were early in the morning and late at night, while in future the main peak 2203 will be late in the evening with a significant reduction in the load in the earlier hours 2201, resulting from high solar power supply during the day. The curve is dominated by cooling requirements which are lower in the morning but remain high for several hours after sunset. Concentrated Liquid desiccant can be stored to handle this load. To cover all the requirements for dehumidification would require about 2 to 20 liters per Ton at very high concentrations (35-45%) to manage the full dehumidification load. During the heat of the day, RH levels for outside air tend to be lower, making concentrating the desiccant easier. Maximizing the value of this capability is best done where demand management of a utility contribute to the value of this feature, justifying the cost of extra tank space and system complexity.

Figure 22:
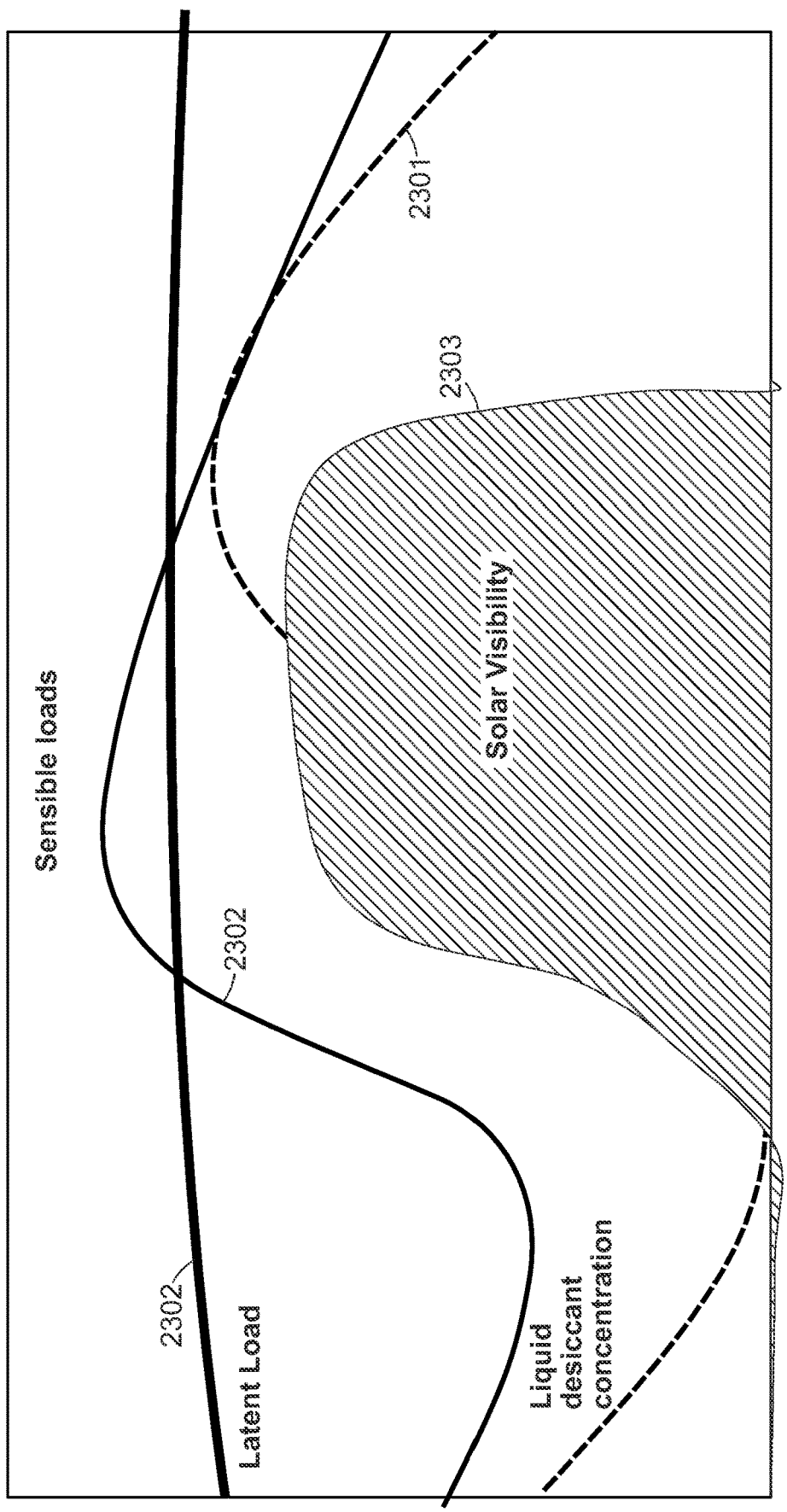
FIG. 22 illustrates the daily cycle of humidity and temperature.

A typical daily temperature cycle in hot and humid climates is shown in FIG. 22. Conditions change from cool with high RH in the early morning to hot with lower RH in the late afternoon (2301) The outside air DP (2302) tends to be stable over this cycle, while the RH varies from a low of 40% to as high as 95% in the early morning (2301). As a result the utility would like to shift substantial loads from 9 PM to earlier in the day.

Figure 23:
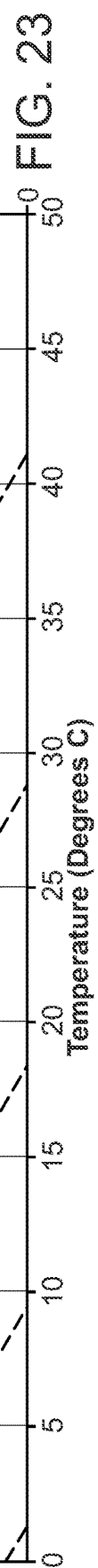
FIGS. 23 and 24 show a Psychrometric chart.

FIG. 23 shows how the outside air humidity 2302 (DP) tends to be stable over the day, but the temperatures 2302 vary significantly in a curve similar to that of the solar supply 2303, but with a higher temperature in the evening. The conditioner needs to supply stable conditions throughout the day: typically, a temperature below 70F and a DP of 40-55% with an RH of 50-60%. The RH of the supply condition is determined by the concentration of the liquid desiccant, depending on the total load and the outside air conditions. Typically, 70% RH requires a concentration of about 20% liquid desiccant and 10% liquid desiccant delivers an RH of about 80%.

Dehumidification loads of a building and supply conditions tend to be stable during the day changing mostly because of occupancy. Liquid desiccant regeneration capacity is driven by the availability of heat. In a compressor-based system more heat is available when the sensible loads are high in the middle and late in the day while much less heat is available in the early morning.

Liquid desiccant regeneration capacity 2301 is driven by the availability of heat. In a compressor-based system more heat is available when the sensible loads are high in the middle and late in the day while much less heat is available in the early morning.

FIG. 23 shows how during a typical east coast daily cycle, temperatures will rise from 20C in the morning 2004 to 35C in the middle of the day 2401. This will reduce the RH from 85% to 40% (2400). Subtropical 2401 and tropical conditions 2402 may vary less over the day with RH ranging from 85% to 50-70% Supply conditions 2403 may vary much less at very high humidities, except for the sensible loads from lights and infiltration that need to be compensated for in the supply condition 2403. Sensible heat ratios (SHR) may vary from 80% at 2400 to between 0 and 0.2 for conditions 2402 and 2404. U.S. Patent Application No. 62/580,270 describes how sensible coils can be used to manage regeneration from humid condition 2402 and dry conditions 2400 to the same supply condition 2403.

Figure 24:
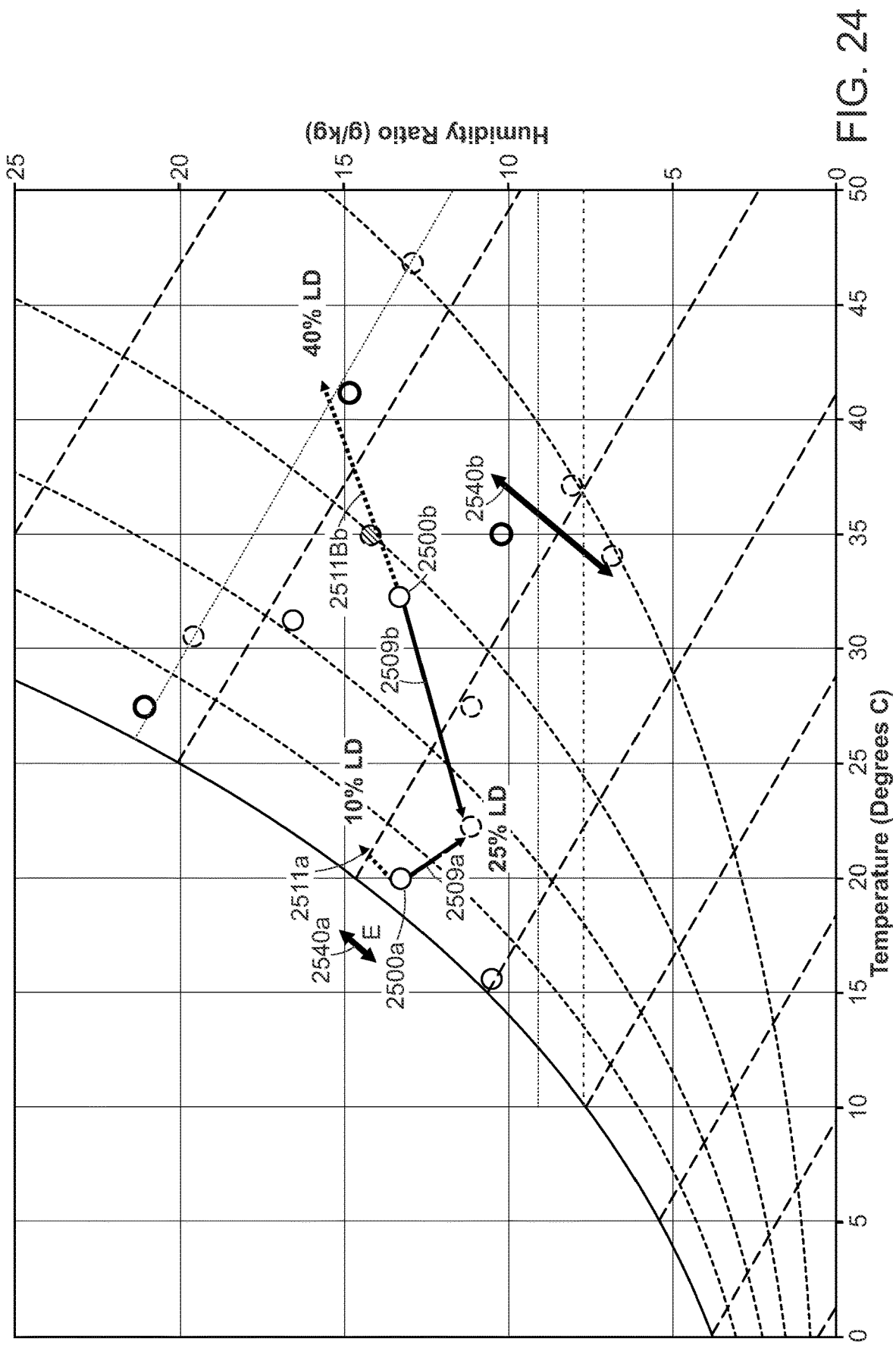

A significant issue is the availability of regeneration heat. FIG. 24 shows how conditioning and regeneration can be out of balance in a compressor-based system without correction from sensible coils. In the morning condition 2500a the condition requires liquid desiccant at a concentration of about 25% to dehumidify and warm the air to supply condition 2509a. The enthalpy different 2540a is much too small to effectively regenerate, therefore the regenerator can only achieve an RH of 95% corresponding to a 10% concentration of liquid desiccant In the afternoon, the conditioner needs to do much more work 2540b to take air at 2500b with the same DP but a much higher DB to the preferred supply condition 2509b. On the condenser side the regenerator is then able to produce liquid desiccant with a concentration as high as 40%. But the conditioner still only requires a concentration of 25%—the same as in the morning. Earlier patents explained how sensible coils, desiccant dilution and additional heat loads can be used to add energy in the early morning and reject energy at night to balance the system.

Additional coils are a significant additional cost. They also reduce system efficiency by adding loads in the morning and compressor lift in the evening.

A similar unbalance in available energy for regeneration at different points during the day exists in non-compressor-based systems. For example, in a thermal solar based evaporative cooling (DEVAP or desiccant enabled evaporative cooling) regenerates only when the sun shines, while cooling and dehumidification will still be required during the day. Systems that use waste heat e.g. from cogeneration have heat only available when power is required. Storage of heat in the form of hot water is possible but requires large volumes.

By using liquid desiccant storage as a way to manage short term fluctuations between high and low RH conditions, additional coils and hot water storage can be avoided while maintaining the ability to maintain supply conditions over the range of ambient conditions that is normally encountered during a day.

Earlier patents by the patent applicant described how air-cooled coils can be used to reject excess heat and generate additional loads by cooling the regeneration exhaust or outside air. Both require the compressor to do more work. Instead of using advanced dehumidification coils and heat dump coils, concentrated liquid desiccant can be generated by the regenerator when excess compressor heat is available, then stored and only used when it is required to maintain conditioner supply conditions. The latter avoid the need for the additional load of the advanced dehumidification coil Compared to other forms of heat storage, liquid desiccant storage is highly efficient with about 30 kWh per gallon of evaporated humidity, or about 12 kWh per gallon "storage tank" space. Liquid desiccant concentration peaks at sunset and bottoms out at sunrise. It does require larger storage tanks and pumps but the size and weight of these will at least partially offset by avoiding the need for air-cooled coils and fans.

Figure 25:
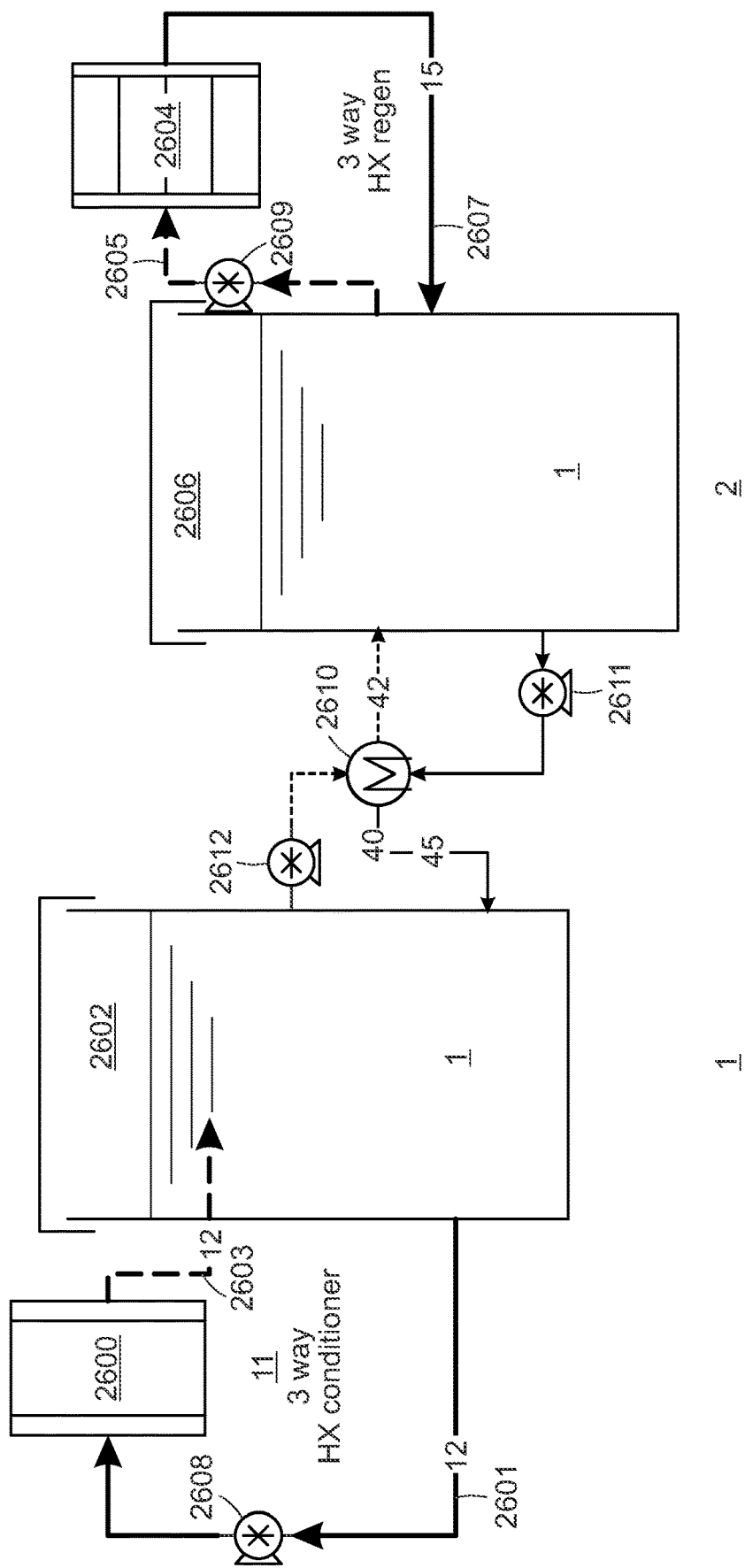
FIG. 25 illustrates an exemplary liquid desiccant air conditioning system in accordance with one or more embodiments, showing the conditioner/evaporator and regenerator/condenser coil activity during the daily cycle.
Figure 26:
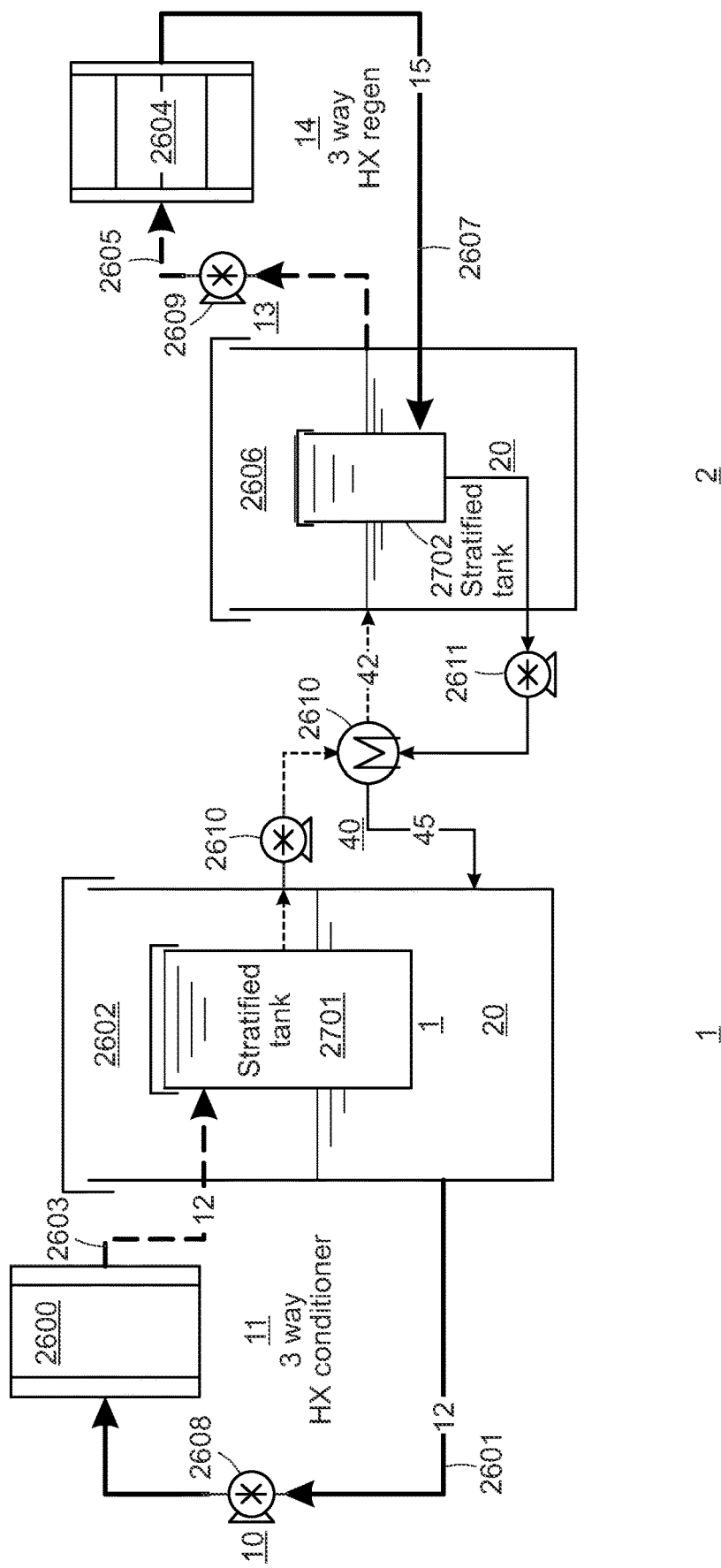
FIG. 26 illustrates an exemplary liquid desiccant air conditioning system in accordance with one or more embodiments, including a multi-tank system with stratified liquid desiccant tanks.

FIG. 25 shows how in cooling mode, conditioner 2600 dehumidifies and cools air. It gets higher concentration liquid desiccant 2601 from tank 2602 with pump 2608. Diluted liquid desiccant 2603 is returned to tank 2602. The regenerator 2604 concentrates desiccant 2605 from tank 2606 and returns highly concentrated desiccant 2607. Pumps 2608 and 2609 pump the desiccant from respective tank 2602 and 2606 to the conditioner and regenerator. As the desiccant in tank 2602 is diluted and cooled and the desiccant in tank 2606 becomes more concentrated and warmer, desiccant needs to be pumped using pumps 2611 and 2612 between the two tanks through heat exchanger 2610. By using two tanks, the concentration of 2602 can be adjusted to match the required RH of the supply air. Concentrating the liquid desiccant in tank 2606 can be done when sufficient regeneration capacity is available, e.g., during the day when significant sensible cooling is required. The liquid desiccant in tank 2606 cannot crystalize which limits the max concentration to about 45 to 50% liquid desiccant for LiCl depending on the temperature of the liquid desiccant in the tank. Highly concentrated liquid desiccant has the capacity to absorb up to 2.5 Gallons of H2O per gallon of desiccant as the concentration moves from 20 to about 40%.

In heating mode, the temperatures and concentrations in the tank are reversed.

With a dual tank system, the system will use diluted liquid desiccant at 20-25% during the cool hours at 2500a. At those conditions the cooling is close to adiabatic, so the compressor does little work 2540a to get to supply condition 2509a. The heat 2511a is insufficient to re-concentrate the liquid desiccant as the RH of the air remains >90%. Later in the day at 2500b compressor does significant work 2540b which is available for the regenerator. The regenerator has the total enthalpy from 2509 plus the heat from the regenerator is available for regeneration 2511b. As a result, the regenerator can reach temperatures that easily re-concentrate desiccant from 25% to a high concentration at 40%. It a heat dump coil is still required it can be sized to prevent overconcentration at concentrations of about 50% where a desiccant like LiCL would crystalize. EER or MRE would improve no additional work is required during the cool conditions 2005a to maintain concentrations.

The effectiveness of the conditioning and regeneration process can be further improved by further separating the concentrated liquid desiccant in a stratified or compartmentalized tank 2701 and 2702 as described in U.S. Provisional Patent Application No. 62/580,270.

Per Ton dehumidification capacity or 150 CFM outside air at 920A condition, the liquid desiccant removes about 3 l or slightly less than 1 gallon per hour in humidity. Assuming a maximum concentration of 40% liquid desiccant and a minimum of 20%, a 2-gallon tank can store about 1-ton hour or 3.4 kWh of dehumidification capacity. At an MRE of 4 kg/kWh this corresponds to about 1 kWh of required system power. This requires about ½ Gallon of a liquid desiccant like LiCl, CaCl or equivalent.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only, and are not intended to be limiting.

The invention claimed is:

1. A liquid desiccant air-conditioning system, comprising:
 (a) a first liquid desiccant unit;
 (b) a second liquid desiccant unit,
 wherein one of said first and second liquid desiccant units is a conditioner and the other of said first and second liquid desiccant units is a regenerator;
 (c) a stratified liquid desiccant tank; and
 (d) a transfer system for transferring liquid desiccant among the first liquid desiccant unit, the second liquid desiccant unit, and the liquid desiccant tank, said transfer system comprising:
  a first conduit coupled to the liquid desiccant tank and the first liquid desiccant unit for transferring liquid desiccant from a lower portion of the liquid desiccant tank to the first liquid desiccant unit;
  a second conduit coupled to the first liquid desiccant unit and the second liquid desiccant unit for transferring liquid desiccant from the first liquid desiccant unit to the second liquid desiccant unit;
  a third conduit coupled to the second liquid desiccant unit and the liquid desiccant tank for transferring liquid desiccant from the second liquid desiccant unit to the liquid desiccant tank;
  a bypass valve in the second conduit;
  a fourth conduit coupled the bypass valve and the liquid desiccant tank for transfer of liquid desiccant between the second conduit and the liquid desiccant tank; and
  one or more pumps associated with at least one of the conduits for pumping liquid desiccant therethrough; and
 (e) a heat exchanger coupled to two of said conduits for exchanging heat between the liquid desiccant flowing in one conduit and liquid desiccant flowing in the other conduit.

2. The system of claim 1, wherein the first liquid desiccant unit is the conditioner, and the stratified liquid desiccant tank is located in a conditioned space.

3. The system of claim 2, wherein the stratified liquid desiccant tank is located in a wet room that includes a water supply for adding water to the liquid desiccant.

4. The system of claim 1, wherein the first liquid desiccant unit is the regenerator, and the stratified liquid desiccant tank is located outside a conditioned space.

5. The system of claim 1, wherein the first liquid desiccant unit is the conditioner, which cools and dehumidifies an air stream provided to a building space when the air-conditioning unit is operated in a cooling and dehumidification mode, and wherein the second liquid desiccant unit comprises the regenerator, which humidifies and heats outside air, return air from the building space, or a combination thereof.

6. The system of claim 1, wherein the first liquid desiccant unit is the conditioner, which heats and humidifies an air stream provided to a building space when the air-conditioning unit is operated in a heating and humidification mode, and wherein the second liquid desiccant unit comprises the regenerator, which dehumidifies and cools outside air, return air from the building space, or a combination thereof.

7. The system of claim 1, wherein the bypass valve can be set to divert all of the liquid desiccant flowing in the second conduit to the liquid desiccant tank instead of the second liquid desiccant unit when the second liquid desiccant unit is inactivated.

8. The system of claim 1, wherein the bypass valve can be set to block liquid desiccant from the first liquid desiccant unit and such that liquid desiccant can be drawn from the liquid desiccant tank into the second conduit for transfer to the second liquid desiccant unit when the first liquid desiccant unit is inactivated.

9. The system of claim 1, wherein the heat exchanger is coupled to the first conduit and the second conduit to exchange heat between the liquid desiccant flowing into the first liquid desiccant unit and the liquid desiccant flowing out of the first liquid desiccant unit.

10. The system of claim 1, wherein the heat exchanger is coupled to the second conduit and the third conduit to exchange heat between the liquid desiccant flowing into the second liquid desiccant unit and the liquid desiccant flowing out of the second liquid desiccant unit.

11. The system of claim 1, wherein the liquid desiccant tank includes at least one sidewall that is angled or otherwise configured such that the upper end of the tank is wider than the lower end of the tank to provide a more linear relation between liquid desiccant concentration and level in the tank.

* * * * *